United States Patent
Kunieda et al.

(10) Patent No.: US 10,403,014 B2
(45) Date of Patent: Sep. 3, 2019

(54) IMAGE PROCESSING APPARATUS AND IMAGE PROCESSING METHOD

(71) Applicant: CANON KABUSHIKI KAISHA, Tokyo (JP)

(72) Inventors: Hiroyasu Kunieda, Yokohama (JP); Masaaki Obayashi, Kawasaki (JP); Yoshinori Mizoguchi, Tokyo (JP); Fumitaka Goto, Tokyo (JP); Masao Kato, Kawasaki (JP); Maya Kurokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 15/227,600

(22) Filed: Aug. 3, 2016

(65) Prior Publication Data
US 2017/0039748 A1 Feb. 9, 2017

(30) Foreign Application Priority Data

Aug. 7, 2015 (JP) .................................. 2015-157651
Dec. 25, 2015 (JP) .................................. 2015-254946

(51) Int. Cl.
G06T 11/60 (2006.01)
G06T 1/00 (2006.01)

(52) U.S. Cl.
CPC ............ G06T 11/60 (2013.01); G06T 1/0007 (2013.01)

(58) Field of Classification Search
None
See application file for complete search history.

(56) References Cited

U.S. PATENT DOCUMENTS

2008/0049976 A1* 2/2008 Isomura .............. G06F 17/3028
382/106
2009/0087104 A1* 4/2009 Nakate .............. G06F 17/30265
382/224

(Continued)

FOREIGN PATENT DOCUMENTS

CN 101164083 A 4/2008
CN 102855906 A 1/2013

(Continued)

OTHER PUBLICATIONS

Jun Li, Joo Hwee Lim, Qi Tian, "Automatic Summarization for Personal Digital Photos"—Dec. 15-18, 2003—ICICS-PCM, vol. 3, pp. 1536-1540.

(Continued)

*Primary Examiner* — Nurun N Flora
(74) *Attorney, Agent, or Firm* — Canon U.S.A., Inc. IP Division

(57) ABSTRACT

An image processing apparatus includes a setting unit setting the number of pieces of image data to be selected, an identifying unit identifying, based on a photographing date and time of each piece of image data of an image data group, a photographing period of the image data group, a dividing unit dividing the identified photographing period into a plurality of photographing sections, a selection unit selecting image data from an image data group corresponding to a target photographing section based on predetermined criteria, and a generation unit generating a layout image by arranging an image based on the selected image data, wherein selection of image data is repeated by setting an unselected photographing section as a next target photographing section to select a number of pieces of image data corresponding to the set number, and wherein the number of (Continued)

photographing sections is determined according to the set number.

19 Claims, 15 Drawing Sheets

(56) References Cited

U.S. PATENT DOCUMENTS

| | | | |
|---|---|---|---|
| 2013/0004073 A1* | 1/2013 | Yamaji | G06T 11/60 |
| | | | 382/173 |
| 2013/0336590 A1* | 12/2013 | Sentinelli | H04N 5/772 |
| | | | 382/218 |
| 2014/0223318 A1 | 8/2014 | Pefferle | |

FOREIGN PATENT DOCUMENTS

| | | |
|---|---|---|
| CN | 104049838 A | 9/2014 |
| JP | H09-305784 A | 11/1997 |
| JP | 2005-327249 A | 11/2005 |
| JP | 2011128938 A | 6/2011 |
| JP | 2011186715 A | 9/2011 |
| JP | 2014-110006 A | 6/2014 |
| JP | 2014192795 A | 10/2014 |
| JP | 2015-114920 A | 6/2015 |

OTHER PUBLICATIONS

Pere Orador, Nathan Moroney, "Automatic Image Selection by means of a Hierarchical Scalable Collection Representation"—2009, Visual Communications and Image Processing, SPIE-IS&T, vol. 7257, 72570W-1-72570W-12.

* cited by examiner

FIG. 5

| IMAGE ID | PHOTOGRAPHING DATE AND TIME | FOCUS | NUMBER OF FACES | PERSONAL ID | | | | | | |
|---|---|---|---|---|---|---|---|---|---|---|
| | | | | 1 | | 2 | | 3 | | |
| | | | | UPPER LEFT POSITION | LOWER RIGHT POSITION | UPPER LEFT POSITION | LOWER RIGHT POSITION | UPPER LEFT POSITION | LOWER RIGHT POSITION | |
| 1 | 07/01/2015 10h11m12s | SUITABLE | 6 | 40, 40 | 65, 65 | 90, 40 | 115, 65 | 10, 20 | 25, 35 | ... |
| 2 | 07/01/2015 10h12m30s | SUITABLE | 2 | 50, 100 | 100, 150 | 150, 125 | 190, 165 | 150, 125 | 190, 165 | ... |
| 3 | 07/01/2015 10h15m54s | SUITABLE | 0 | - | - | - | - | - | - | ... |
| ... | ... | ... | ... | ... | ... | ... | ... | ... | ... | ... |

FIG. 7

| SCENE | PHOTOGRAPHING PERIOD (HOURS) | | NUMBER OF PHOTOGRAPHS TAKEN (NUMBER OF PHOTOGRAPHS) | | NUMBER OF PEOPLE PHOTOGRAPHED (NUMBER OF PEOPLE) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURES OF MAIN SLOT | IMAGE FEATURES OF SUB-SLOT |
|---|---|---|
| TRAVEL | LONG-SHOT IMAGE INCLUDING PERSON AND LANDSCAPE | IMAGE OF CLOSE-UP OR PROFILE FACE |
| DAILY LIFE | IMAGE OF CLOSE-UP OR PROFILE FACE | LONG-SHOT IMAGE INCLUDING PERSON AND LANDSCAPE |
| CEREMONY | IMAGE OF TWO CLOSE FACES | IMAGE INCLUDING MANY PEOPLE |

FIG. 8B

| IMAGE ID | POINTS (OUT OF 50 POINTS) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... |

IMAGE PROCESSING APPARATUS AND IMAGE PROCESSING METHOD

BACKGROUND OF THE INVENTION

Field of the Invention

The present invention relates to an image processing apparatus and an image processing method, and more particularly, to an image processing apparatus and an image processing method for creating an album.

Description of the Related Art

Due to widespread use of smart devices and improvement in the camera performance of smart devices as well as widespread use of digital cameras, the number of photographs a user takes has rapidly increased in recent years. Smart devices are excellent in portability, and therefore, the number of times a user takes casual daily photographs, which are not often taken with digital cameras, has increased.

A method for taking advantage of photographs taken with digital cameras and performing automatic layout of an album has been known. In Japanese Patent Laid-Open No. 2015-114920, a method is suggested in which for analysis of a large number of photographs to achieve automatic selection, the photographs are divided into groups based on the image capture dates and times of the photographs, and image evaluation targets are determined according to the number of photographs included in each of the groups.

However, in the technique suggested in Japanese Patent Laid-Open No. 2015-114920, only photographs belonging to a group of a photographing date and time at which a large number of photographs are taken are used as targets for evaluation, and photographs belonging to a group of a photographing date and time at which a small number of photographs are taken are not evaluated. Therefore, photographs taken on a photographing date and time at which a small number of photographs are taken are not laid out in an album.

SUMMARY OF THE INVENTION

An image processing apparatus according to an aspect of the present invention includes a setting unit configured to set the number of pieces of image data to be selected from a plurality of image data groups,
an acquisition unit configured to acquire an image data group including a plurality of pieces of image data, an identifying unit configured to identify, based on a photographing date and time of each piece of image data of the image data group acquired by the acquisition unit, a photographing period of the acquired image data group, a dividing unit configured to divide the photographing period identified by the identifying unit into a plurality of photographing sections,
a selection unit configured to select image data from an image data group corresponding to a target photographing section based on predetermined criteria, and
a generation unit configured to generate a layout image by arranging an image based on the image data selected by the selection unit,
wherein the selection unit repeats selection of image data by setting an unselected photographing section as a next target photographing section to select a number of pieces of image data corresponding to the number set by the setting unit from the image data group acquired by the acquisition unit, and
wherein the number of photographing sections is determined according to the number set by the setting unit.

Further features of the present invention will become apparent from the following description of exemplary embodiments with reference to the attached drawings.

BRIEF DESCRIPTION OF THE DRAWINGS

FIG. 5 is a diagram for explaining image analysis information according to an embodiment.

FIG. 7 is a diagram for explaining scene categorization according to an embodiment.

FIGS. 8A and 8B are diagrams for explaining image scoring according to an embodiment.

DESCRIPTION OF THE EMBODIMENTS

First Embodiment

Hereinafter, an embodiment of the present invention will be described in detail with reference to drawings.

In a first embodiment, a method for use in an image processing apparatus in which an application for creating an album is operated so that automatic layout is generated will be described by way of example.

Figure 1:
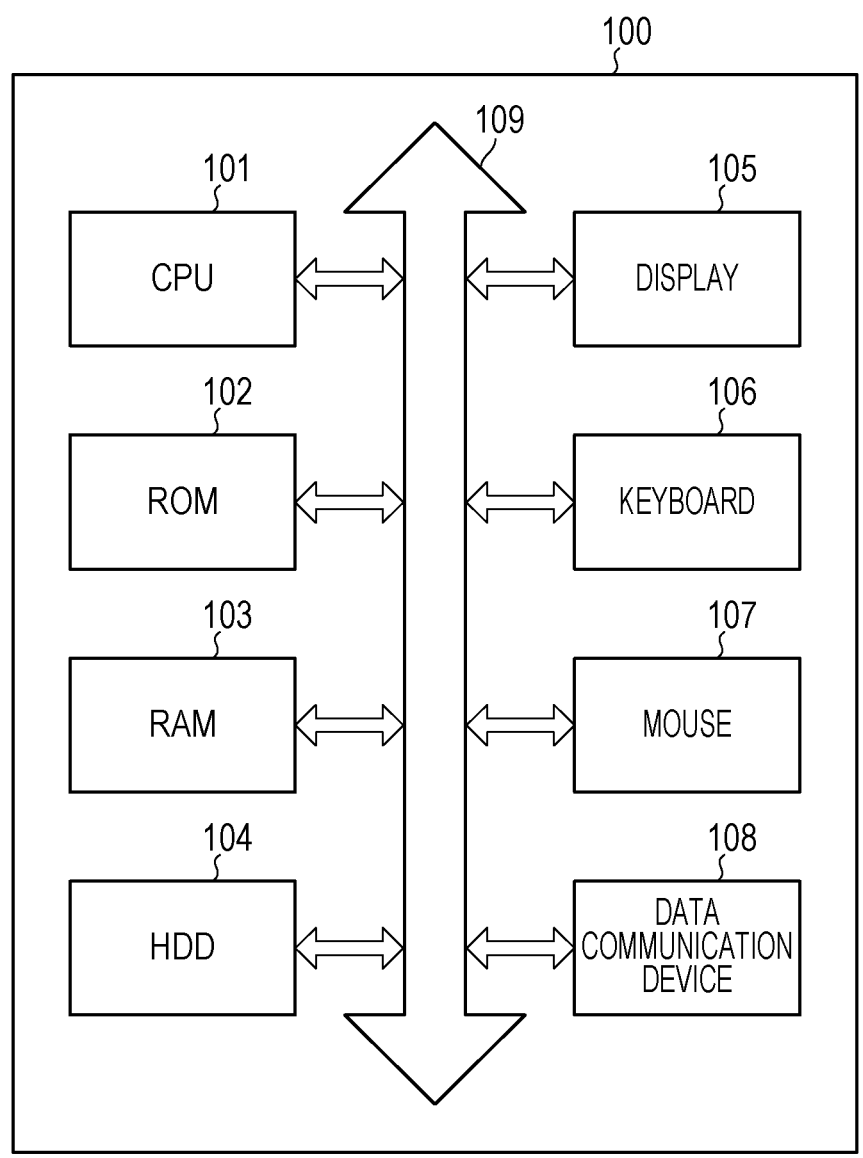
FIG. 1 is a block diagram of hardware which may execute an application according to an embodiment.

FIG. 1 is a block diagram for explaining a hardware configuration of an image processing apparatus according to an embodiment of the present invention. The image processing apparatus may be, for example, a personal computer (PC) or a smartphone. In the first embodiment, a PC is used as the image processing apparatus.

Referring to FIG. 1, an image processing apparatus 100 includes a central processing unit/processor (CPU) 101, a read only memory (ROM) 102, a random access memory (RAM) 103, a hard disk (HDD) 104, a display 105, a keyboard 106, a mouse 107, and a data communication device 108. The above components are connected to one another by a data bus 109.

The CPU 101 is a system controller, and controls the entire image processing apparatus 100. Furthermore, the CPU 101 executes an image processing method which will be described in the first embodiment in accordance with a program. In FIG. 1, only one CPU 101 is provided. However, the present invention is not limited to this. A plurality of CPUs 101 may be provided.

In the ROM 102, a program to be executed by the CPU 101 is stored. The RAM 103 provides a memory for temporarily storing various types of information at the execution of the program by the CPU 101. The HDD 104 is a storage medium for storing a database which holds image filed and processing results of image analysis and the like. In the first embodiment, the HDD 104 stores an application program for creating an album, which will be described later.

The display 105 is a device which presents to a user a user interface (UI) in the first embodiment and layout results of images. The display 105 may have a touch sensor function. The keyboard 106 is an example of an input device, and is used, for example, for inputting predetermined information on the UI which is displayed on the display 105. In the first embodiment, the number of double-page spreads of an album is input via the keyboard 106. The mouse 107 is an example of an input device, and is used, for example, for clicking a button on the UI which is displayed on the display 105.

The data communication device 108 is a device for communication with an external apparatus such as a printer or a server. For example, data of automatic layout is transmitted to the printer or the server which is connected to the PC via the data communication device 108.

The data bus 109 allows connection between the above-mentioned components 102 to 108 and the CPU 101.

Figure 2:
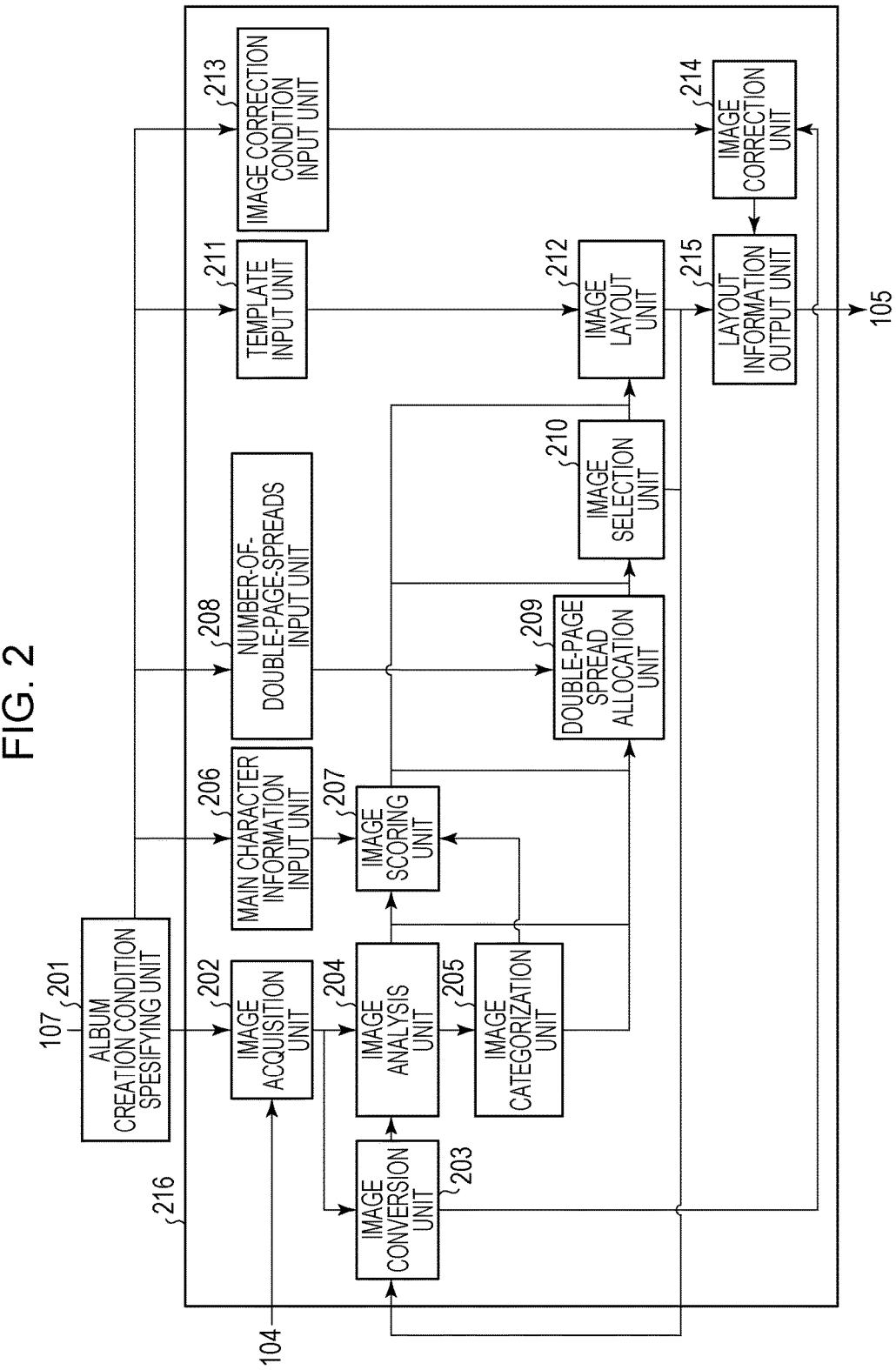
FIG. 2 is a block diagram of software of an application according to an embodiment.

FIG. 2 is a software block diagram of an album creation application according to an embodiment of the present invention. In the first embodiment, an album creation application which is stored in the HDD 104 is activated when an icon of the application which is displayed on the display 105 is double-clicked with the mouse 107 by a user. The album creation application has various functions. In the first embodiment, in particular, an automatic layout function which is provided by an automatic layout processing unit 216 will be described. As illustrated in FIG. 2, the application includes an album creation condition specifying unit 201 and the automatic layout processing unit 216. The automatic layout function is a function for laying out photographs by categorizing or selecting taken photographs on the basis of the details and attributes of the photographs and generating an album image to be displayed on the display 105.

The album creation condition specifying unit 201 specifies album creation conditions to the automatic layout processing unit 216 in accordance with a UI operation using the mouse 107. In the first embodiment, the album creation condition specifying unit 201 specifies, as album creation conditions, a main character, the number of double-page spreads, the type of a template, and whether or not to perform image correction. The specification of an image may be based on association information and attribute information of individual pieces of image data, such as photographing date and time, or based on the structure of a file system including image data, such as specification of a device or directory. A double-page spread corresponds to, for example, one display window for display, and corresponds to a pair of adjacent pages which are printed on different sheets for printing.

An image acquisition unit 202 acquires from the HDD 104 an image group (image data group) which is specified by the album creation condition specifying unit 201. The above-mentioned image group represents a candidate image group to be laid out when one album is created. For example, in the case where "from January 1, 20XX to December 31, 20XX" is specified by the album creation condition specifying unit 201, all the images which were captured during the period from January 1, 20XX to December 31, 20XX correspond to a specified image group.

Still images and cut-out images which are cut out from moving images are examples of images stored in the HDD 104. Still images and cut-out images are acquired from an image capturing device such as a digital camera or a smart device. The image capturing device may be provided in the image processing apparatus 100 or may be provided in an external apparatus. In the case where the image capturing device is provided in an external apparatus, images are acquired via the data communication device 108. Furthermore, still images and cut-out images may be acquired from a network or a server via the data communication device 108. Social networking service images (hereinafter, referred to as "SNS images") are examples of images acquired from a network or a server. A program which is executed by the CPU 101 analyzes data associated with each image and determines a place into which the data is to be stored. Regarding an SNS image, by acquiring an image from an SNS via an application, an acquisition source of the image may be managed within the application. Images are not limited to the above-mentioned images. Other types of images may be acquired.

An image conversion unit 203 converts the number of pixels and color information of image data. In the first embodiment, image data is converted into image data with 420 pixels on a short size and color information of sRGB.

An image analysis unit 204 performs analysis processing for image data. In the first embodiment, the image analysis unit 204 performs analysis processing for image data which has been converted by the image conversion unit 203. Specifically, the image analysis unit 204 acquires the feature amount from image data, and performs detection of a face in the image data, recognition of expression of the detected face, and personal recognition of the detected face. Furthermore, the image analysis unit 204 acquires the photographing date and time from data (for example, Exif information) which is associated with an image acquired from the HDD 104.

An image categorization unit 205 divides the acquired image group, that is, the image group which is specified by the album creation condition specifying unit 201, into scenes. Scene division is performed based on photographing date and time information, number-of-images information, and detected face information. A scene represents a photographing scene such as travel, a daily life, or a wedding ceremony. A scene may be expressed as a group of images which are captured for a certain photographing target for a certain period of photographing opportunity.

A main character information input unit 206 inputs an ID (identification information) of a main character which is specified by the album creation condition specifying unit 201 to an image scoring unit 207.

The image scoring unit 207 scores each image. In the first embodiment, the image scoring unit 207 scores each image in such a manner that an image which is suitable for a layout has a high score. For scoring such that an image which is suitable for a layout has a high score, information which is acquired by the image analysis unit 204 and information which is acquired by the image categorization unit 205 are used. Furthermore, other types of information may be used additionally or instead of the above information. In the first embodiment, the image scoring unit 207 scores each image in such a manner that an image including a main character ID which is input by the main character information input unit 206 has a high score.

A number-of-double-page-spreads input unit 208 inputs to a double-page spread allocation unit 209 the number of double-page spreads of an album which is specified by the album creation condition specifying unit 201.

The double-page spread allocation unit 209 divides an image group and allocates the divided sections to double-page spreads. The double-page spread mentioned above represents, for example, a double-page spread when an album is created. Although an explanation for a double-page spread will be provided, a page may also be used. The double-page spread allocation unit 209 divides an image group in accordance with the input number of double-page spreads, and allocates some of the image group to individual double-page spreads. For example, in the case where the number of double-page spreads is five, small image groups are generated by dividing an acquired image group into five sections, and a single small image group is allocated to each double-page spread.

An image selection unit 210 selects an image from an image group which is allocated to each double-page spread by the double-page spread allocation unit 209, based on a score provided by the image scoring unit 207.

A template input unit 211 inputs to an image layout unit 212 a plurality of templates which correspond to template information which is specified by the album creation condition specifying unit 201.

The image layout unit 212 determines the layout of an image. Specifically, the image layout unit 212 selects a template which is suitable for images which are selected by the image selection unit 210 from among the plurality of templates which are input by the template input unit 211, and determines the layout (arrangement position) of each image.

A layout information output unit 215 outputs layout information for display on the display 105, based on the image layout which is determined by the image layout unit 212. Layout information is, for example, bitmap data in which selected images are laid out (arranged) in a selected template.

An image correction unit 214 performs dodging processing, red-eye correction, and contrast correction. An image correction condition input unit 213 inputs to the image correction unit 214 ON/OFF conditions for image correction which is specified by the album creation condition specifying unit 201. ON/OFF of image correction may be specified for each type of correction or may be specified for all the types of correction in a collective manner. In the case where an image correction condition indicates ON, the image correction unit 214 performs correction for an image. In the case where an image correction condition indicates OFF, the image correction unit 214 does not perform correction. The number of pixels of an image to be input to the image correction unit 214 from the image conversion unit 203 may be varied according to the size of a layout image which is determined by the image layout unit 212. In the first embodiment, after a layout image is generated, image correction is performed for each image. However, the present invention is not limited to this. Before layout (arrangement) is done for a double-page spread, correction of each image may be performed.

Figure 3:
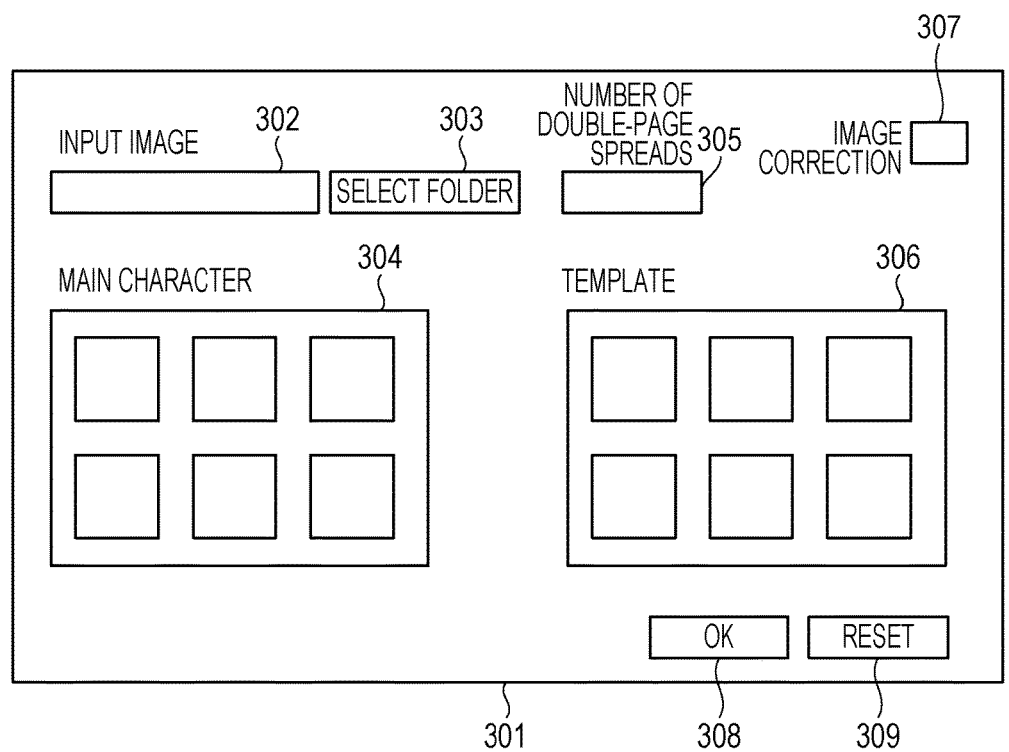
FIG. 3 is a diagram of a display screen which is displayed by an application according to an embodiment.

Image data which is output from a layout information output unit 215 is displayed on the display 105 in a format, for example, illustrated in FIG. 3.

When the album creation application according to the first embodiment is installed on the image processing apparatus 100, an activation icon of the album creation application is displayed on a top screen (desktop) of an operating system (OS) operating on the image processing apparatus 100. When a user double-clicks, with the mouse 107, the activation icon on the desktop which is displayed on the display 105, the program of the album creation application which is stored in the HDD 104 is loaded to the RAM 103. Then, the program in the RAM 103 is executed by the CPU 101, and the album creation application is activated.

FIG. 3 illustrates a display screen 301 which is provided by the activated album creation application. The display screen 301 is displayed on the display 105. The user may set album creation conditions via the display screen 301. The user may set album creation conditions, which will be described later, using a UI configuration screen 301, which is a display screen. The display screen 301 includes, as a unit for specifying an image group, a path box 302 and a folder selection button 303. The path box 302 of the display screen 301 represents a storage location (path) in the HDD 104 where an image group as a target for album creation is stored. The folder selection button 303 is a button for selecting a folder which includes an image group as a target for album creation from a tree structure displayed. When the user clicks, with the mouse 107, the folder selection button 303 to select a folder which includes an image group as a target for album creation from a tree structure displayed, a folder path which includes the selected image group is displayed in the path box 302.

In a main character specifying unit 304, a plurality of human face images are displayed as icons. When an icon is selected, a main character is specified. A face image is displayed for each person in the main character specifying unit 304. In other words, in the main character specifying unit 304, a single face image is displayed for each person, and each face image is associated with a personal ID. The main character specifying unit 304 is used for identify a main character, which is a core person, from among people in an analysis target image, that is, in a photograph. A face image is, for example, detected from an image in advance, and is registered in association with a personal ID in a face database. Icons which are displayed in the main character specifying unit 304 are, for example, face images of people selected by the user or face images of people determined in a method described later, from among face images of people registered in the face database. A plurality of icons of face images of different people are arranged in the main character specifying unit 304, and an icon may be selected by clicking with the mouse 107. A main character may be automatically set in accordance with a procedure illustrated in FIGS. 4A and 4B. However, the user may manually set a main character by specification using the main character specifying unit 304. A person corresponding to an icon which is selected by the user from among the icons displayed in the main character specifying unit 304 is specified as a main character.

A number-of-double-page-spreads box 305 is a box for specifying the number of double-page spreads in an album. The user may directly input, with the keyboard 106, a number to the number-of-double-page-spreads box 305 or may input, with the mouse 107, a number to the number-of-double-page-spreads box 305 from a list.

In a template specifying unit 306, a plurality of illustration images which represent tastes of templates (pop, stylish, and other tastes) are displayed as icons, and a template may be specified. In the first embodiment, a template includes image arrangement frames (slots) in which images are arranged. In the template specifying unit 306, a plurality of icons of templates are arranged, and a template may be selected by clicking with the mouse 107.

With a checkbox 307, ON/OFF of image correction may be specified. When the checkbox 307 is ticked, the above-mentioned image correction is turned on. When the checkbox 307 is not ticked, the image correction is turned off. In the first embodiment, all the types of image correction are turned on and off by a single button. However, the present invention is not limited to this. A checkbox may be provided for each type of image correction.

An OK button 308 is a button for setting a condition selected on the display screen 301 as an album creation condition. When the user clicks (selects) the OK button 308 with the mouse 107, the album creation conditions are confirmed, and the album creation conditions are transmitted to the automatic layout processing unit 216 via the album creation condition specifying unit 201. Specifically, a path which is input to the path box 302 is transmitted to the image acquisition unit 202. The personal ID of a main character which is selected by the main character specifying unit 304 is transmitted to the main character information input unit 206. The number of double-page spreads which is input to the number-of-double-page-spreads box 305 is transmitted to the number-of-double-page-spreads input unit 208. Template information of an icon which is selected by the template specifying unit 306 is transmitted to the template input unit 211. ON/OFF of image correction of an image correction checkbox is transmitted to the image correction condition input unit 213.

A reset button 309 is a button for resetting each type of setting information on the display screen.

Figure 4A:
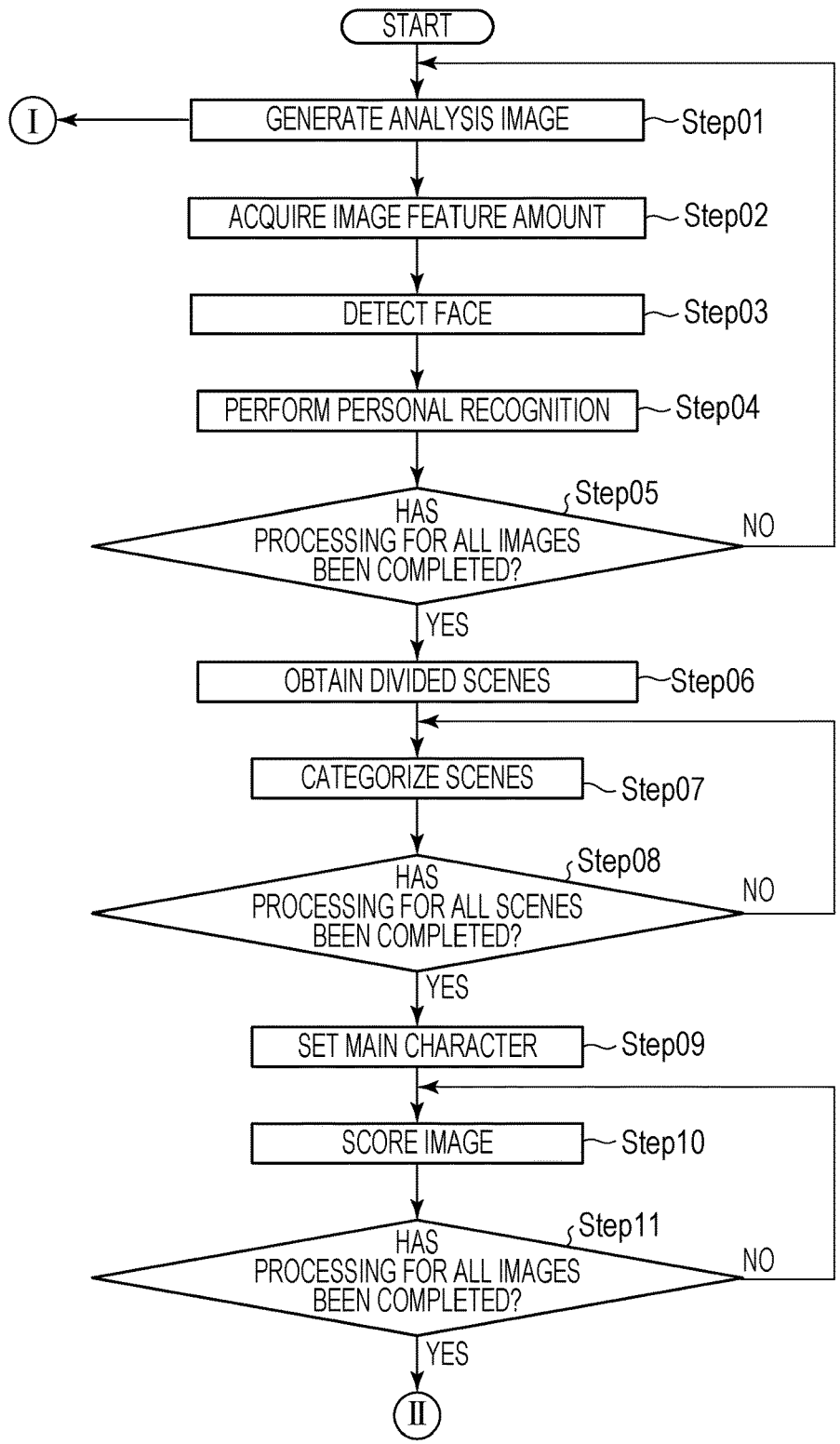
FIGS. 4A and 4B are a flowchart of a process of automatic layout according to an embodiment.
Figure 4B:
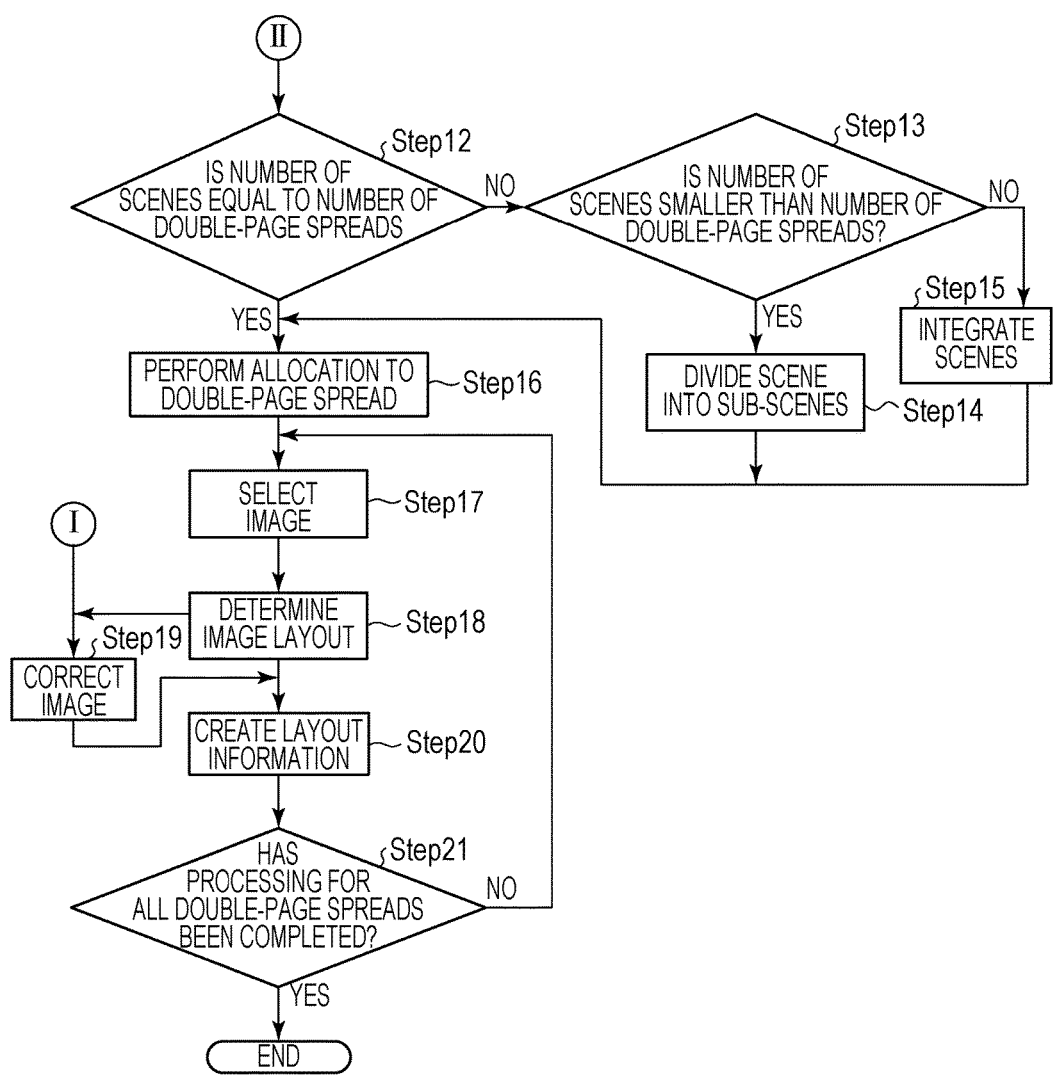

FIGS. 4A and 4B are a flowchart of a process which is performed by the automatic layout processing unit 216 of the album creation application according to the first embodiment. The flowchart illustrated in FIGS. 4A and 4B are implemented, for example, when the CPU 101 reads a program which is stored in the HDD 104 to the ROM 102 or the RAM 103 and executes the read program. The process of automatic layout will be described below with reference to FIGS. 4A and 4B. As described below, in the first embodiment, for creation of an album, an image group for creating an album is divided into sub-image groups (hereinafter, may be referred to as "sections") in accordance with photographing time, and an image to be arranged in a page is selected from the sub-image groups.

In step S01, images included in a specified image group are sequentially set as target images, and an analysis image is generated by the image conversion unit 203. Each image in an image group which is specified by the album creation condition specifying unit 201 and acquired from the HDD 104 is converted into image data with a predetermined number of pixels and color information. The number of pixels and color information to be obtained by conversion are determined in advance, and are stored in a program or a parameter file which is used by the program. In the first embodiment, input image data is converted into analysis image data with a size of 420 pixels on a short side and color information of sRGB.

In step S02, the image analysis unit 204 acquires the image feature amount of the image data. The photographing date and time is acquired from information which is associated with each piece of image data included in the image group which is acquired from the HDD 104. In the first embodiment, photographing date and time is acquired from Exif information which is associated with each piece of image data. Furthermore, the feature amount of image quality is acquired from the analysis image data which is generated in step S01. The feature amount of image quality may be, for example, focusing. Well-known Sobel filtering may be used as an edge detection method. An edge of an image is detected using a Sobel filter, and the tilt of an edge, that is, the brightness gradient, is calculated by dividing the brightness difference between a start point and an end point of the edge by the distance between the start point and the end point. It may be determined that an image with a large average tilt of edges of the image is in more focus than an image with a small average tilt. In the first embodiment, a plurality of tilt thresholds are set, and it is determined, by determining whether or not the average tilt is equal to or more than any of the tilt thresholds, whether or not the focus amount is allowable. In the first embodiment, two different tilt thresholds are set, and a determination as to the focus amount is performed in three stages: suitable, acceptable, and unacceptable. In the case where the average tilt of edges in an image is equal to or more than a first threshold, the focus gradient is determined to be suitable. In the case where the average tilt is equal to or more than a second threshold, which is smaller than the first threshold, the focus gradient is determined to be acceptable. In the case where the average tilt is less than the second threshold, the focus gradient is determined to be unacceptable.

In step S03, the image analysis unit 204 detects a face in each piece of image data. A face is detected from the image data which is generated in step S01. A well-known method may be used for face detection. For example, Adaboost for creating a strong discriminator from a plurality of weak discriminators may be used as a well-known method. In the first embodiment, with the strong discriminator which is created by Adaboost, the face of a person (object) is detected. In step S03, along with detection (extraction) of a face image, an upper left coordinate value and a lower right coordinate value at the position of a face image which is detected in an image are acquired. The "image" mentioned above represents an image which is represented by the image data which is generated in step S01. By identifying the two types of coordinates, the position of the face of a person and the size of the face may be identified. Although an explanation for the case where the face of a person is detected is described in this example, a human face is not necessarily detected. A strong discriminator may be created by Adaboost by using an animal such as a dog or a cat, an object such as flower, a food, a building, or an ornament, or the like as a detection target, instead of a human face. That is, an object different from a face may be detected.

In step S04, the image analysis unit 204 performs personal recognition. First, the similarity between the face image which is extracted in step S03 and a representative face image which is stored for each personal ID the in face dictionary database is determined. Then, a personal ID with a similarity that is equal to or more than a threshold and is maximum is determined to be the ID of the extracted face image. That is, a person who corresponds to the ID with a similarity that is equal to or more than the threshold and is maximum is identified as the person of the extracted face image. In the case where the similarity is less than the threshold, a new personal ID is allocated to the extracted face image as a new person, and is registered to the face dictionary database.

Image analysis information of each piece of image data which is acquired in the processing of step S02 to step S04 is classified for each ID for identifying an image and is stored in the HDD 104, as illustrated in FIG. 5. The photographing date and time information and the focusing determination result which are acquired in step S02 and the number of faces and positional information which are detected in step S03 are stored as image analysis information of each piece of image data. An image based on a single piece of image data may include a plurality of face images. In this case, positional information of faces is classified and stored for each personal ID which is acquired in step S04. In the case where no face is detected in image data, the photographing date and time information and the focusing determination result which are acquired in step S02 are stored.

In step S05, it is determined whether or not the processing of step S01 to step S04 has been completed for all the images of the image group in the HDD 104 which is specified by the album creation condition specifying unit 201. In the case where the processing has not been completed for all the images (No in step S05), the process returns to step S01. In the case where the processing has been completed for all the images (Yes in step S05), the process proceeds to step S06.

Figure 6A:
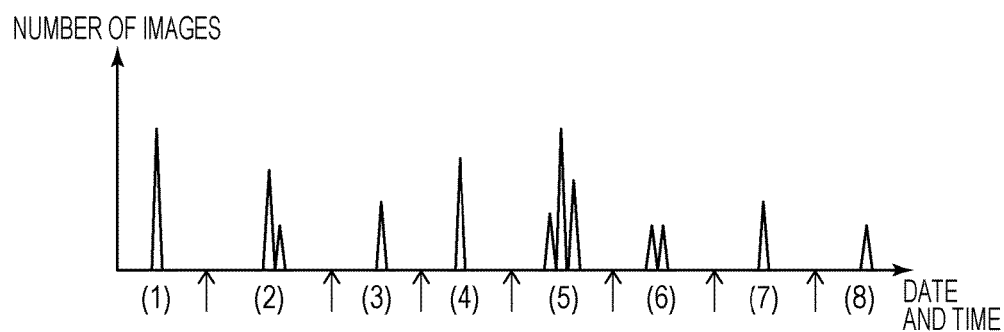
FIGS. 6A to 6C are diagrams for explaining image group division according to an embodiment.

In step S06, the image categorization unit 205 performs scene division. Scene division represents dividing an acquired image group into a plurality of sub-image groups according to the scenes. Specifically, in accordance with the photographing date and time information which is acquired in step S02, the image group is divided into a plurality of sub-image groups, based on the time difference between images. An example of criteria for division is described below. For example, first, the image with the oldest (or newest) photographing date and time of the image group is set as a target image, and then, the time difference from the second oldest (newest) image is referred to. Subsequently, the target image is shifted one by one to the next oldest (newest) image, and a determination as to whether or not any of the conditions described below is satisfied is performed. In the explanation provided below, division represents dividing an image group into images with a new photographing date and time and images with an old photographing date and time according to the border between two images. In the case where photographing dates of images are not continuous, that is, in the case where there is a date on which no photograph is taken exists between images, division is performed. Next, the case where photographing dates are continuous will be explained. In the first embodiment, in the case where a difference in the photographing time between images is equal to or more than sixteen hours, division is performed. In the case where a difference in the photographing time between images is less than sixteen hours, if the time difference between the first photographing and the last photographing on individual dates which are continuous is less than four hours, division is performed. In the first embodiment, in the case where the time difference is equal to or more than four hours, division is performed if the number of photographs taken on each of the dates which are continuous is less than fifty, whereas division is not performed if the number of photographs taken on each of the continuous dates is equal to or more than fifty. The threshold for the time difference and the threshold for the number of photographs which are used for division are not limited to the above. FIG. 6A illustrates a result of division performed in the scene division method described above.

In step S07, the image categorization unit 205 categorizes the scenes. In the first embodiment, a case where the sub-image groups (scenes) are categorized into three: travel, daily life, and ceremony, is described by way of example. However, the categorization is not limited to this. First, a plurality of sub-image groups which are determined in advance whether to be categorized into travel, daily life, or ceremony, are acquired. The feature amount of photographing is acquired for each image group. In the first embodiment, the feature amount to be acquired includes, for example, the photographing period, the number of photographs taken, and the number of people photographed. The photographing period represents the time difference between the first photographing and the last photographing of an image group. The number of photographs taken represents the number of images (number of photographs) included in a sub-image group. The number of people photographed represents the number of faces in an image including faces. That is, the number of people photographed represents the number of faces included in an image. Then, the average value and the standard deviation of photographing periods, the average value and the standard deviation of the numbers of photographs taken, and the average value and the standard deviation of the numbers of people per image are acquired for a plurality of sub-image groups. In the first embodiment, it is assumed that the number of faces per image corresponds to the number of people per image. FIG. 7 illustrates an example of the average value and the standard deviation of each of the photographing period (hours), the number of photographs taken (number of photographs), and the number of people photographed (number of people). The obtained values are incorporated in advance into a program of the album creation application. That is, parameters are created by learning using images collected in advance at a stage of design, and the created parameters are incorporated into the program. After the album creation application is activated, the average value of each of the photographing period, the number of photographs taken, and the number of people photographed is calculated for each sub-image group which is obtained in step S06. Then, based on the average value and the standard deviation, scoring for the feature amount of each of the photographing period, the number of photographs taken, and the number of people photographed of each sub image group is performed for each scene, in accordance with equations (1) and (2).

Score for each scene and feature amount=50-|10× (average value for each scene and feature amount−feature amount for each sub-image group)/standard deviation for each scene and feature amount| (1)

Average score for each scene=(score of photographing period for each scene+score of number of photographs taken for each scene+score of number of people for each scene)/number of items of feature amount (2)

Based on equation (1) and equation (2), the score for each scene and each feature amount of a target sub-image group is obtained. For example, the score of each of the photographing period, the number of photographs taken, and the number of people photographed for a travel scene is obtained. By obtaining the average of the scores based on equation (2), a score for the scene category is obtained. In a similar manner, scores are obtained for other scene categories, such as daily life and ceremony. As described above, the average score is obtained for each of scene categories of travel, daily life, and ceremony. The scene with the highest score for each sub-image group is classified as a scene of the sub-image group. In the case where two or more scenes have the same score, scene categorization is performed in accordance with a priority scene. For example, in the first embodiment, priority given to daily life, ceremony, and travel in that order is determined in advance, and the highest priority is given to daily life. The order of priority is not limited to the above. A user may set the order of priority.

Regarding a sub-image group (5) in FIG. 6A which is obtained after scene division, the photographing period is 36 hours, the number of photographs taken is 300, and the number of people photographed is 1.7. The average score for travel is 45.32, the average score for daily life is 18.38, and the average score for ceremony is −29.92. Therefore, the scene for the sub-image group is classified as travel. A sub-image group is managed in association with a scene ID so that scene recognition may be performed.

In step S08, it is determined whether or not scene categorization of step S07 has been completed for all the sub-image groups obtained by step S06. In the case where scene categorization has not been completed for all the sub-image groups (No in step S08), the process returns to step S07. In the case where scene categorization has been completed for all the sub-image groups (Yes in step S08), the process proceeds to step S09.

In step S09, the image scoring unit 207 performs main character setting. Main character setting is performed for an image group which is specified by a user, and includes two types of setting: automatic setting and manual setting. In the case where a main character is automatically set, setting is performed based on a result of personal recognition in step S04 and a result of scene division in step S06. Based on the result obtained in step S04, the number of times that each personal ID appears in a sub-image group, the number of times that each personal ID appears in each scene, the number of times that a scene in which each personal ID appears, and the like are identified, and a main character is set automatically in accordance with the above information. In the first embodiment, in the case where a sub-image group includes a plurality of scenes, a personal ID that appears in a plurality of scenes is set as a main character ID, and in the case where a sub-image group includes a single scene, a personal ID that appears a large number of times in the single scene is set as a main character ID. In the case where a user specifies a specific icon at the main character specifying unit 304, a personal ID which corresponds to the selected icon is transmitted via the main character information input unit 206 to the image scoring unit 207. In the case where a personal ID which is specified by a user exists, a main character ID which is set by the automatic setting described above is ignored, and the personal ID which is specified by the user is set as a main character ID. As described above, setting based on specification by the main character specifying unit 304 is defined as manual setting.

In step S10, the image scoring unit 207 performs scoring. Scoring represents providing a score to each piece of image data in accordance with evaluation which is made from the point of view described later, and the score is a value to be referred to when image selection, which will be described later, is performed. A scoring method will be described below with reference to FIGS. 8A and 8B and FIG. 10.

Figure 10:
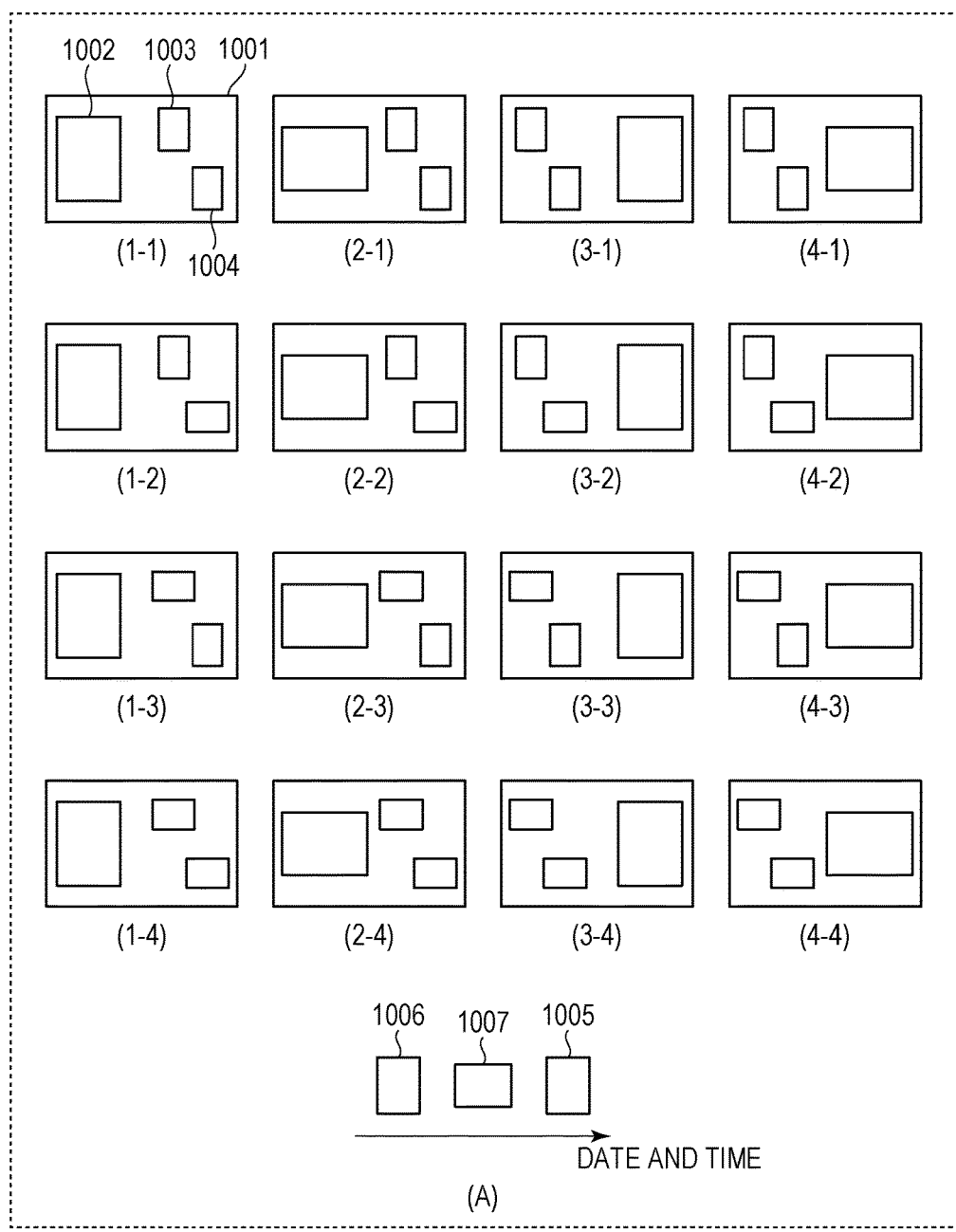
FIG. 10 is a diagram for explaining image layout according to an embodiment.

FIG. 10 illustrates a template group which is used when three images are laid out. A template 1001 which is illustrated in (1-1) of FIG. 10 is one template, and includes a main slot 1002, a sub-slot 1003, and a sub-slot 1004. The main slot 1002 is a slot (a frame in which an image is laid out) as a main slot in the template 1001, and has a size larger than the sub-slot 1003 or the sub-slot 1004. That is, a main slot is the largest slot in each template. Furthermore, a sub-slot is a slot different from a main slot in each template. A score for a main slot and a score for a sub-slot are both added to each piece of image data.

Criteria for scoring of image data are illustrated in FIG. 8A. More specifically, FIG. 8A illustrates a table in which features of an image with a high score are provided for each of the scenes of travel, daily life, and ceremony. As illustrated in FIG. 8A, features which provide a high score vary according to the type of slot. For example, in the case where the scene category of a sub-image group is travel, a long-shot image including a person and a landscape has a high score as a main slot, and an image of a close-up or profile face has a high score as a sub-slot. For example, in the case where the scene category of a sub-image group is daily life, an image of a close-up or profile face has a high score as a main slot, and a long-shot image including a person and a landscape has a high score as a sub-slot. For example, in the case where the scene category of a sub-image group is ceremony, an image of two close faces has a high score as a main slot, and an image including many people has a high score as a sub-slot. As described above, features which provide a high score, that is, evaluation criteria, vary according to the type of scene and slot. In the first embodiment, features which provide a high score which are associated with the type of scene and slot are set in advance in an application and are included in a program. Features which provide a high score are not limited to the above. Based on the features of a main slot and a sub-slot of each scene illustrated in FIG. 8A, a score is provided to each piece of image data included in each sub-image group. The number of faces in each image, the position of a face in each image, and the size of a face in each image are acquired, and the average value and standard deviation are obtained with respect to each scene and each slot type (main slot and sub-slot), and are stored in the program of the album creation application. The scene to which an image represented by each piece of image data of an image group which is specified by a user belongs (categorized) is identified from a result of scene categorization in step S07. Then, based on the average value and standard deviation which are obtained in advance in association with a scene of a target image and each of the feature amounts of the number of faces, the position of a face, and the size of a face of a main character ID in the target image, a score and an average score are obtained using equations provided below. In the equations provided below, a score, an average value, and a standard deviation are obtained for each scene category, for each slot type, and for each feature amount.

Score=50−|10×(average value−feature amount)/standard deviation|

Average score=(score of number of faces+score of face position+score of face size)/number of feature amount items Scoring is performed for both of a main slot and a sub-slot. Furthermore, for an image to be used for an album, a score may be added to an image with an image ID for which the feature amount of focus is suitable in FIG. 5. Accordingly, an in-focus image may have a high score. FIG. 8B illustrates an example of a scoring result of each image. Scores for a main slot and a sub-slot are provided to each image ID.

In step S11, it is determined whether or not the image scoring unit 207 has completed image scoring in step S10 for all the images of the image which is specified by the user. In the case where image scoring has not been completed for all the images (No in step S11), the process returns to step S10. In the case where image scoring has been completed for all the images (Yes in step S11), the process proceeds to step S12.

In step S12, the double-page spread allocation unit 209 determines whether or not the number of scenes (number of sub-image groups) obtained by scene division by the image categorization unit 205 is equal to the number of double-page spreads input by the number-of-double-page-spreads input unit 208. In the case where the number of scenes is not equal to the input number of double-page spreads (No in step S12), the process proceeds to step S13. In the case where the number of scenes is equal to the input number of double-page spreads (Yes in step S12), the process proceeds to step S16. For example, in the case where the number of scenes divided in FIG. 6A is 8 and the number input by the number-of-double-page-spreads input unit 208 is 8, the process proceeds to step S16.

In step S13, the double-page spread allocation unit 209 determines whether or not the number of scenes obtained by scene division by the image categorization unit 205 is smaller than the number of double-page spreads input by the number-of-double-page-spreads input unit 208. In the case where the number of scenes is not smaller than the number of double-page spreads (No in step S13), the process proceeds to step S15. In the case where the number of scenes is smaller the number of double-page spreads (Yes in step S13), the process proceeds to step S14. For example, in the case where the number of scenes divided in FIG. 6A is 8 and the number input by the number-of-double-page-spreads input unit 208 is 10, the number of scenes is smaller than the number of double-page spreads, and therefore the process proceeds to step S14.

Figure 6B:
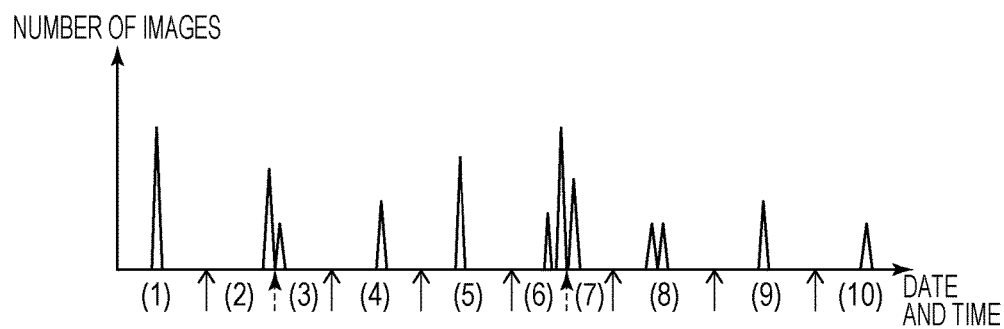

In step S14, the double-page spread allocation unit 209 performs sub-scene division. Sub-scene division represents a divided scene is further divided into sub-scenes in the case where the number of scenes divided is smaller than the number of double-page spreads. A case where the number of scenes divided in FIG. 6A is 8 and the specified number of double-page spreads is 10 will be described by way of example. In FIG. 6B, a result obtained by sub-scene division performed for the case illustrated in FIG. 6A is illustrated. By further dividing sub-image groups at positions expressed by broken line arrows, the number of divided sub-scenes becomes 10. Sub-scene division is performed based on the number of images and the photographing date and time. Among the divided sub-image groups of FIG. 6A, a sub-image group with a large number of images is identified. In this case, in order to increase the number of scenes by two from 8 to 10, two sub-image groups with a large number of images are identified. That is, a number of scenes that are to be divided again are specified in order from the scene including the largest number of images. For scenes including the same number of images, a scene that has a larger maximum value of the difference in the photographing date and time between images is selected. If determination is not still possible, a scene to be divided may be selected in an appropriate manner. For example, a temporally earlier scene is preferentially divided. The sub-image groups with a large number of images are a sub-image group 5, which includes the largest number of images, and a sub-image group 1 and a sub-image group 2, which include the second largest number of images. In the first embodiment, in the case where the number of images included in a sub-image group is the same, a sub-image group with a larger time difference between the first image and the last image included in the sub-image group is divided. The sub-image group 1 and the sub-image group 2 include the same number of images. However, the sub-image group 2 has a larger time difference between the first image and the last image, and therefore, the sub-image group 2 is defined as a division target. That is, in FIGS. 6A and 6B, each of the sub-image group 5 and the sub-image group 2 is further divided. First, a method for dividing the sub-image group 2 will be explained. The sub-image group 2 has two peaks of the number of images, and the two peaks represent different photographing dates. In this case, division is performed at a point (point indicated by a broken line arrow in FIG. 6B) which is the border between different photographing dates. Next, division of the sub-image group 5 will be explained. The sub-image group 5 has three peaks of the number of images, and the three peaks represent different photographing dates. In this case, division is performed at a point which is the border between different photographing dates. There are two points each of which is the border between different photographing dates, and division is performed in such a manner that the difference in the number of images between image groups after division becomes as small as possible. In FIG. 6B, for the sub-image group 5, the difference in the number of images between image groups after division performed at the border between the second day and the third day is smaller than the difference in the number of images between image groups after division performed at the border between the first day and the second day, and therefore, division is performed at the border between the second day and the third day. That is, division is performed at a point indicated by a broken line arrow in FIG. 6B. Accordingly, the number of scenes divided is changed from 8 to 10. In this example, division is performed at a point between different photographing dates. However, in the case where sub-image groups including a large number of images are captured on the same day, division is performed at a point of the single day at which the time difference is maximum.

Figure 6C:
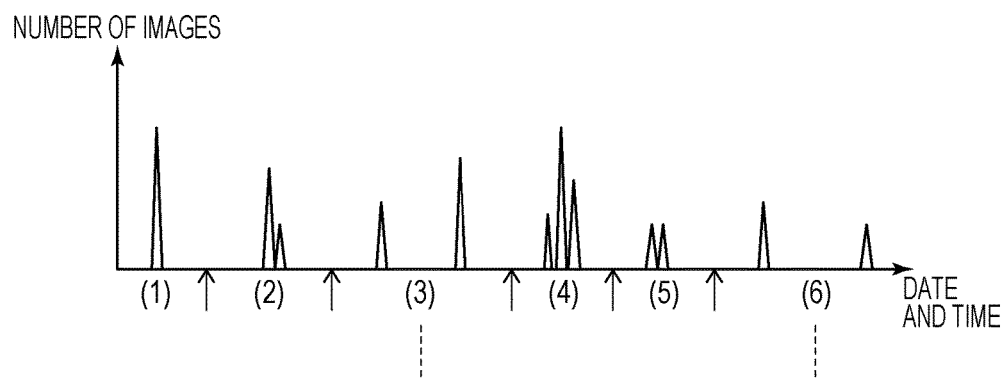

In step S15, the double-page spread allocation unit 209 performs scene integration. Scene integration represents integrating divided scenes (sub-image groups) in the case where the number of scenes is larger than the number of double-page spreads. Specifically, scene integration is performed so that the number of scenes becomes equal to the number of double-page spreads. FIG. 6C illustrates a result of scene integration for the case illustrated in FIG. 6A and the number of scenes becomes 6. By integration at points indicated by broken lines, that is, by not performing division at points indicated by broken lines, the number of scenes (the number of sub-image groups) becomes 6. In scene integration, a sub-image group with a small number of images is identified. In this example, in order to reduce the number of sub-image groups divided by two from 8 to 6, a sub-image group including a small number of images is identified. Sub-image groups including a small number of images are a sub-image group 8, which includes the smallest number of images, and a sub-image group 3 and a sub-image group 7, which include the second smallest number of images. Therefore, first, the sub-image group 8 is defined as an integration target. Next, the sub-image group 3 and the sub-image group 7 include the same number of images. However, since the sub-image group 8, which is adjacent to the sub-image group 7, is an integration target, the sub-image group 3 is defined as an integration target. Next, it is determined whether a sub-image group as an integration target is to be integrated with a sub-image group with an earlier photographing date and time or to be integrated with a sub-image group with a later photographing date and time. First, integration of the sub-image group 3 will be described. When the time difference between the sub-image group 3 and the sub-image group 2, which is immediately before the sub-image group 3, is compared with the time difference between the sub-image group 3 and the sub-image group 4, which is immediately after the sub-image group 3, the difference in the photographing time between the last image of the sub-image group 3 and the first image of the sub-image group 4 is smaller than the difference in the photographing time between the first image of the sub-image group 3 and the last image of the sub-image group 2. Therefore, it is determined that the sub-image group 3 is to be integrated with the sub-image group 4. That is, integration is performed at a point indicated by a broken line in FIG. 6C. Next, integration of the sub-image group 8 will be explained. Since the sub-image group 8 has no subsequent sub-image group, the sub-image group 8 is integrated with the sub-image group 7, which is immediately before the sub-image group 8. That is, integration is performed at a point indicated by a broken line in FIG. 6C. In the first embodiment, although sub-image groups with a smaller photographing time difference are integrated together. However, the present invention is not limited to this. For example, a sub-image group as an integration target may be integrated with a sub-image group including a smaller number of photographs taken.

In step S16, the double-page spread allocation unit 209 performs double-page spread allocation. By the processing of steps S12 to S15, the number of sub-image groups is made equal to the specified number of double-page spreads. In the first embodiment, allocation to each double-page spread is started from the sub-image group with the earliest photographing date and time. That is, sub-image groups are allocated to double-page spreads of an album in the order of photographing date and time. Accordingly, an album in which sub-image groups are arranged in the order of photographing date and time may be created. As described later, images are not necessarily arranged in the order of photographing date and time within a double-page spread.

Figure 9A:
FIGS. 9A to 9I are diagrams for explaining image selection according to an embodiment.
Figure 9B:
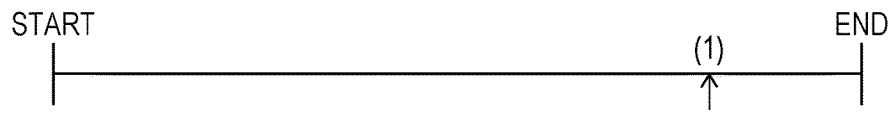
Figure 9C:
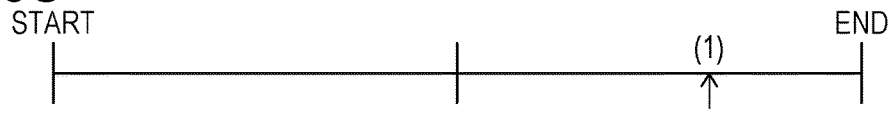
Figure 9D:
Figure 9E:
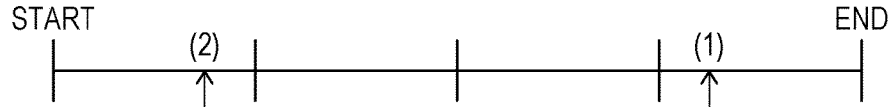
Figure 9F:
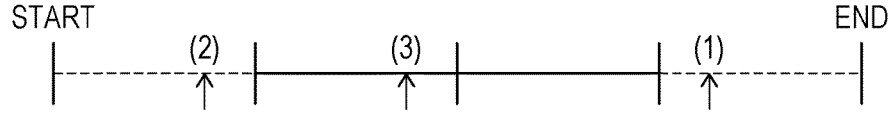
Figure 9G:
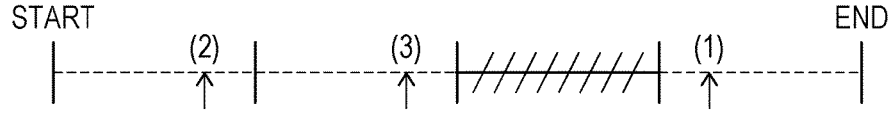
Figure 9H:
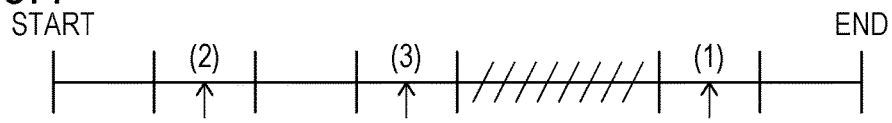
Figure 9I:
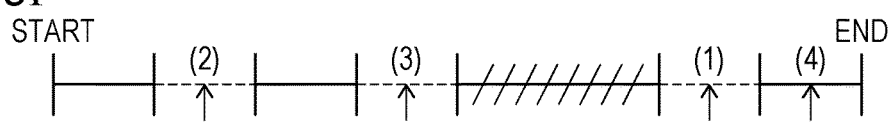
Figure 11:
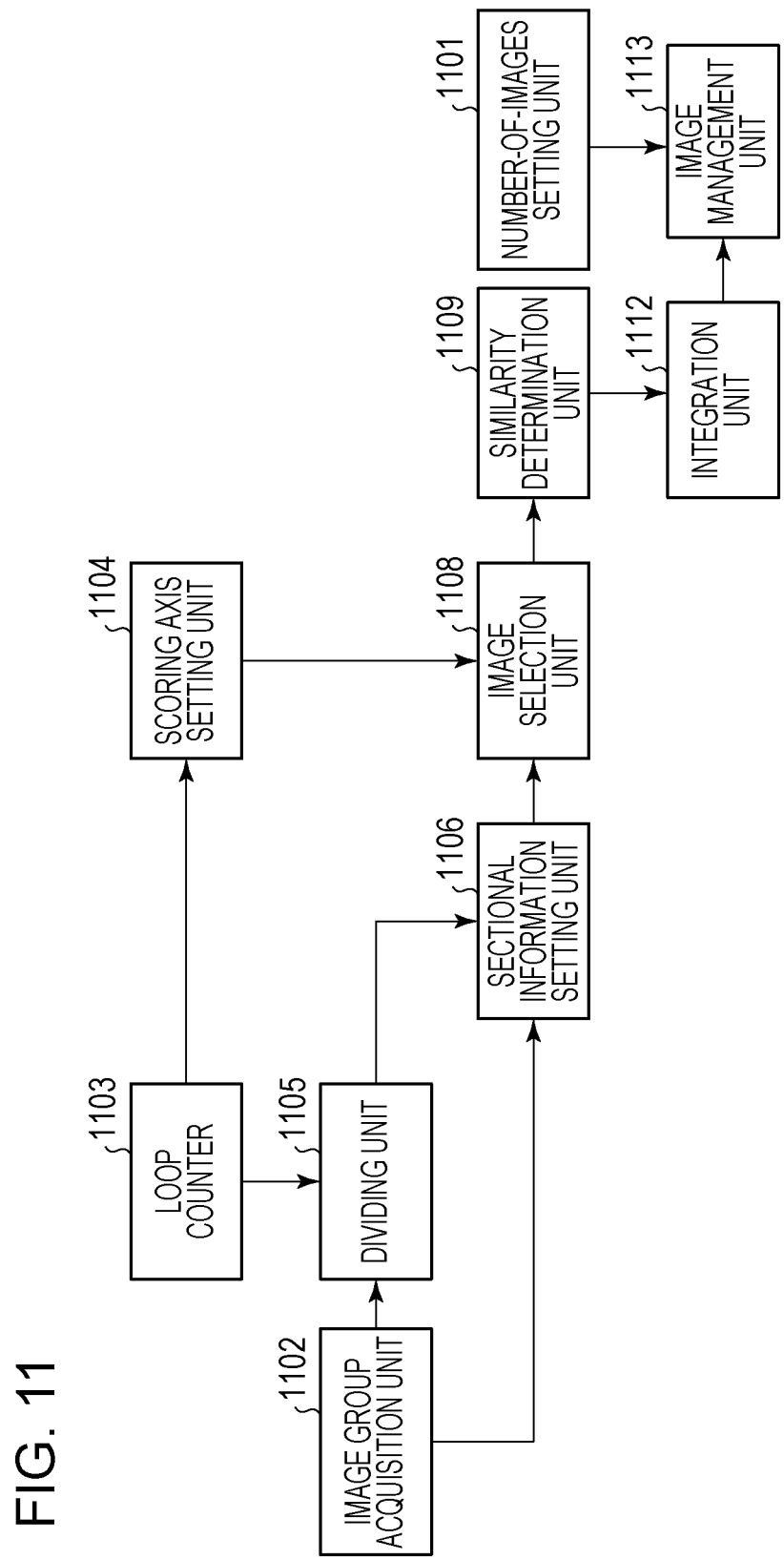
FIG. 11 is a diagram for explaining detailed image selection according to an embodiment.

In step S17, the image selection unit 210 selects a predetermined number of images from each sub-image group. A case where four images are selected from a sub-image group which is allocated to a double-page spread will be explained with reference to FIGS. 9A to 9I by way of example. A double-page spread represents two pages, and each of the first double-page spread and the last double-page spread represents one page. FIG. 9A illustrates the time difference in the photographing date and time between the first image and the last image included in a sub-image group which is allocated to a double-page spread, that is, the photographing period of the sub-image group. A method for selecting the first image of four images to be selected will be explained with reference to FIG. 9B. A template includes the main slot 1002. For the first image, an image for the main slot is selected. Among all the images captured during the photographing period of the sub-image group illustrated in FIG. 9B, an image with the highest score for the main slot which is provided in step S10 is selected. Then, for the second and later images, images for sub-slots are selected. In the first embodiment, by dividing the photographing period of a sub-image group to select an image, concentration at a part of the photographing period of the sub-image group is avoided. First, as illustrated in FIG. 9C, the photographing period of the sub-image group is divided into two photographing sections (periods). That is, the sub-division photographing period is equally divided (grouped) into two photographing sections. Next, as illustrated in FIG. 9D, an image with the highest score for a sub-slot is selected as the second image from the photographing section (section indicated by a solid line) from which the first image is not selected. Next, as illustrated in FIG. 9E, each photographing section in FIG. 9D is equally divided into two. An image with the highest score for a sub-slot is selected as the third image from among images captured in the solid-line photographing sections in FIG. 9F, that is, the two photographing sections (images corresponding to two photographing sections) from which the first or second is not selected. Next, an example in which no image exists within a photographing section from which an image is to be selected and image selection is thus not possible will be explained by way of example of selection of the fourth image. In the first embodiment, a photographing period is divided according to time, irrespective of the number of images. Therefore, no image may exist within a photographing section which is obtained by division. For example, as illustrated in FIG. 9G, it is assumed that although a user wants to select the fourth image from a photographing section from which no image has been selected (a photographing section indicated by an oblique line), no image exists within the photographing section indicated by the oblique line. In this case, as illustrated in FIG. 9H, each of the photographing sections from which an image has been selected is divided into two. Next, as illustrated in FIG. 9I, an image with the highest score for a sub-slot is selected as the fourth image from among images captured in photographing sections from which the first, second, or third image has not been selected. FIG. 11 is a diagram for explaining in more detail the image selection unit 210 which is illustrated in FIG. 2. The image selection unit 210 selects an image from a sub-image group which is allocated to a double-page spread.

A number-of-images setting unit 1101 sets the total number of images to be selected from a sub-image group which is allocated to a double-page spread as a processing target. In other words, the number-of-images setting unit 1101 sets the number of image to be arranged in a layout image of a double-page spread.

An image group acquisition unit 1102 acquires a sub-image group which is allocated to a double-page spread from among image groups acquired by the image acquisition unit 202. For acquisition of image groups, photographing date and time information, a score for a main slot, and a score for a sub-slot of each image are acquired.

A loop counter 1103 manages the number of times that processing for selecting an image is performed. Processing for selecting an image is performed in accordance with the method described with reference to FIGS. 9A to 9I. The managed number of times is used for determining a scoring axis to be used and for setting how many photographing sections the photographing section of a sub-image group which is allocated to a double-page spread as a processing target is to be divided into.

A scoring axis setting unit 1104 sets a scoring axis to be used, in accordance with the number of processing times which is counted by the loop counter 1103. "Setting a scoring axis to be used" represents "setting evaluation criteria for an image". In this example, either a main slot scoring axis (main slot evaluation criteria) or a sub-slot scoring axis (sub-slot evaluation criteria) which is calculated in step S10 is set. In the first embodiment, setting is performed by switching between the main slot scoring axis and the sub-slot scoring axis. As described above, evaluation criteria are set for each slot. For example, the main-slot scoring axis is set for the first time so that processing for selecting a main image may be executed, and the sub-slot scoring axis is set for the subsequent times so that processing for selecting a sub-image may be executed. In the first embodiment, an example in which the main-slot scoring axis or the sub-slot scoring axis is used as a scoring axis to be used is described. However, other scoring axes may be used. For example, in addition to the main-slot scoring axis and the sub-slot scoring axis, a person relevance ratio scoring axis may be used. As the person relevance ratio, for example, scoring may be performed based on the number of times that a person appears and the number of times that a person is photographed together. Specifically, in the case where the number of times that a person appears is large, it may be determined that the relevance ratio is high, and in the case where the number of times that a person is photographed together is large, it may be determined that the relevance ratio is high. Furthermore, although a case in which switching is performed between scoring axes is described, an integrated scoring axis, which is an integration of the main-slot scoring axis, the sub-slot scoring axis, the person relevance ratio scoring axis, and the like, may be used. In this case, different weights may be provided to the scoring axes for calculation of an integrated score. Furthermore, a scoring axis to be used may be varied at random in accordance with the number of times that processing is performed or switching between scoring axes may be performed by referring to a table which is prepared in advance.

A dividing unit 1105 divides a photographing period into a predetermined number of sections. First, the photographing start time and the photographing end time of a sub-image group which is allocated to a double-page spread as a processing target are identified based on the photographing time of the sub-image group which is acquired by the image group acquisition unit 1102, and a photographing period is calculated. That is, the photographing time of an image that is captured at the earliest time and the photographing time of an image that is captured at the latest time among images included in the sub-image group are identified, and the photographing period is calculated. Next, based on the number of processing times which is counted by the loop counter 1103, the calculated photographing period is equally divided into photographing sections. The number of photographing sections divided is set according to the power of 2 based on counting. In the first embodiment, a method for equally dividing the photographing period by the power of 2 based on counting is described. However, the present invention is not limited to this. The photographing period may be equally divided by the number of counts. Furthermore, the dividing unit 1105 outputs the start time of each of the divided sections and the photographing end time.

A sectional information setting unit 1106 divides an image included in the sub-image group which is acquired by the image group acquisition unit 1102 into groups for individual sections obtained by the dividing unit 1105, and stores photographing information of the image and information of the individual sections such as scores of the images.

An image selection unit 1108 selects an image with a high score from each section based on the scoring axis which is set by the scoring axis setting unit 1104 and a score of an image which is set by the sectional information setting unit 1106. As described above with reference to FIGS. 9A to 9I, no image is selected from a section including no image. In the first embodiment, one image is selected from each section. However, a plurality of images may be selected from each section.

A similarity determination unit 1109 performs, for each section, determination of the similarity between a selected image and an image selected by the previous counter. In the case where the similarity is equal to or more than a determination threshold, it is determined that the images are similar to each other. In the case where the similarity is less than the determination threshold, it is determined that the images are not similar to each other. In the case where it is determined that the images are not similar to each other, an image which is selected from the section is stored. In the case where it is determined that the images are similar to each other, a selected image in the section is disposed of. The similarity determination may be performed by determination based on pattern matching, determination using a SHIFT method, or the like. The determination threshold used for similarity determination is changed according to the photographing time difference between comparison images.

For example, in the case where a similarity determination result is output in the range from 0 to 100, the similarity becomes higher as the value becomes closer to 100. In the case where the similarity determination result is equal to or more than the determination threshold, it is determined that the images are similar to each other. In the case where the similarity determination result is less than the determination threshold, it is determined that the images are not similar to each other. In the case where the photographing time difference is small due to rapid shooting or the like (for example, within 15 seconds), a low determination threshold (for example, 60) is set. In other cases, the determination threshold is set to 80. By setting a low determination threshold, images are easily determined to be similar to each other. Even in the case where the similarity between images is low, the images are determined to be similar to each other. Thus, a selected image is canceled. In the first embodiment, determination criteria are changed according to a photographing time difference.

An integration unit 1112 selects an image that is to be finally left from among images of individual sections for which non-similarity is determined by the similarity determination unit 1109. In the case where images are selected from a plurality of sections, it is determined from which section an image is to be selected. For determination of an image, the same score as that used for determination by the image selection unit 1108 is used, and an image with a high score is selected. In the first embodiment, an image with a high score is selected. However, the present invention is not limited to this. For example, an image may be selected from a section which does not have an adjacent section from which an image has been selected.

An image management unit 1113 adds an image which is selected by the integration unit 1112 as a selected image, and determines whether the necessary number of images which is set by the number-of-images setting unit 1101 is not exceeded. In the case where the necessary number of images is reached, image selection processing ends. In the case where the necessary number of images is not reached, count up of the loop counter 1103 is performed, and the above-mentioned image selection processing is performed again.

Figure 12:
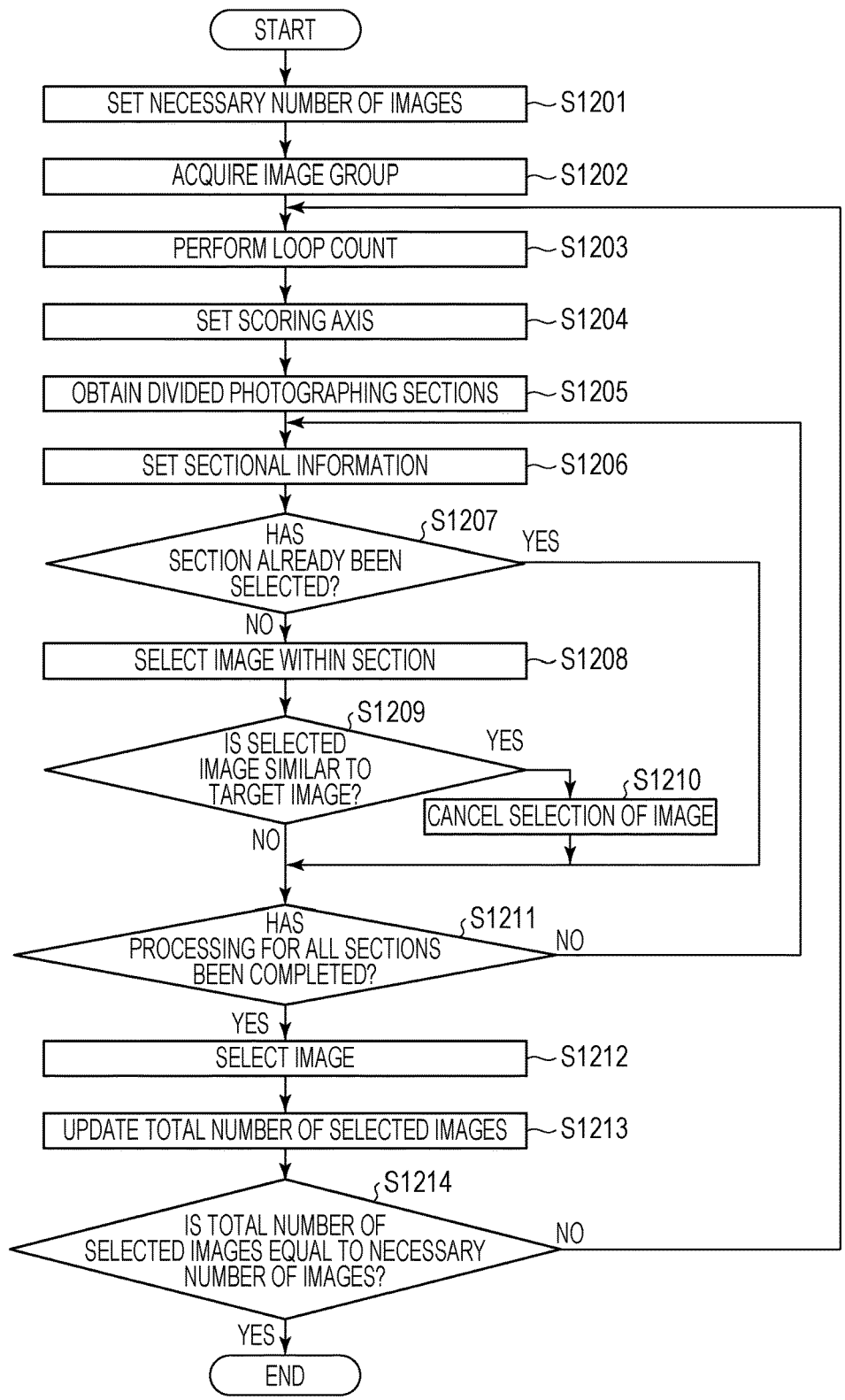
FIG. 12 is a detailed flowchart of image selection according to an embodiment.

FIG. 12 is a flowchart of a process of image selection illustrated in FIG. 11. A detailed flow for selecting an image from a sub-image group which is allocated to a double-page spread as a processing target will be described.

In step S1201, the number-of-images setting unit 1101 sets the total number of images to be selected from a sub-image group which is allocated to a double-page spread as a processing target. That is, the number-of-images setting unit 1101 sets the number of pieces of image data to be selected for a double-page spread as a processing target.

In step S1202, the image group acquisition unit 1102 acquires image data which corresponds to the sub-image group (sub-image data group) which is allocated to the double-page spread as a processing target from the image data of the image data group acquired by the image acquisition unit 202.

In step S1203, the loop counter 1103 counts the number of times that processing for selecting an image is performed. In the initial state, processing for selecting an image has not yet been performed. Therefore, 0 is set.

In step S1204, the scoring axis setting unit 1104 sets a scoring axis to be used. In the first embodiment, a scoring axis to be used is set in accordance with the number of image selection processing times, which is managed by the loop counter.

In step S1205, the dividing unit 1105 calculates the photographing period of the sub-image group from the photographing start time and the photographing end time of images included in the sub-image group which is allocated to the double-page spread as a processing target. The photographing start time represents the photographing time of the oldest image among images included in the sub-image group which is allocated to the double-page spread as a processing target, and the photographing end time represents the photographing time of the newest image among the images included in the sub-image group. Then, based on the number of processing times which is counted by the loop counter 1103, the photographing period of the sub-image group is equally divided into sections. In the first loop, processing has not yet been performed, and therefore, division is not performed.

In step S1206, the sectional information setting unit 1106 divides image data of the acquired sub-image group into groups for individual sections divided, and acquires photographing information of each image and a score of each image for each section. In step S1207, it is determined whether or not an image of a target section which is obtained by the dividing unit 1105 has already been selected. In the case where the target section is a section which has already been selected, the process proceeds to step S1211. In the case where the target section is a section which has not yet been selected, the process proceeds to step S1208. In the first loop, division into sections has not yet been performed, and therefore, there is only one target section.

In step S1208, the image selection unit 1108 selects one image from the target section.

In step S1209, the similarity determination unit 1109 performs, for each section, determination of the similarity between an image of the target section with the image which is selected by the previous counter. In the case where it is determined that the images are not similar to each other, an image which is selected from the section is stored, and the process proceeds to step S1211. In the case where it is determined that the images are similar to each other, a selected image in the section is canceled (S1210), and the process proceeds to step S1211.

In step S1211, it is determined whether or not the processing for image selection has been completed for all the sections obtained in step S1205. In the case where the processing has been performed for all the sections, the process proceeds to step S1212. In the case where the processing has not been completed for all the sections, the process returns to step S1206, and image selection is performed for a section which has not been yet selected for image selection.

In step S1212, the integration unit 1112 performs selection of an image to be finally left from images of individual sections for which non-similarity is determined by the similarity determination unit 1109. That is, in the case where two or more images remain in the processing of steps S1207 to S1211, an image to be left is selected.

In step S1213, the image management unit 1113 adds the selected image to the images which have already been selected, and the total number of selected image is managed.

In step S1214, it is determined whether or not the total number of selected images which is managed by the image management unit 1113 is equal to the necessary number of images which is set by the number-of-images setting unit 1101. In the case where the total number of selected images is equal to the necessary number of images, the image selection process ends. In the case where the total number of selected images is smaller than the necessary number of images, the process returns to step S1203, and the image selection process continues to be performed. At this time, the counter which is managed by the loop counter 1103 is incremented by one. As a result, division into a number of sections which is twice the number of sections in the previous division is set by the dividing unit 1105, which is linked with the loop counter 1103. By division into a larger number of sections, the rank of the score of an image within a section is changed. Therefore, an image which was not selected in the previous processing is selected.

Referring back to FIG. 4B, in step S18, the image layout unit 212 determines the image layout for a double-page spread as a processing target. A case where the template input unit 211 inputs templates (1-1) to (4-4) in FIG. 10 to a double-page spread in accordance with specified template information will be explained by way of example. The number of slots of the input template is three. It is assumed that the orientation, that is, the longitudinal direction or lateral direction, of selected three images are arranged in the order of photographing date and time, as illustrated in (A) of FIG. 10. In this example, an image 1005 is selected for a main slot, and an image 1006 and an image 1007 are selected for sub-slots. In the first embodiment, an image with an older photographing date and time is laid out on the upper left of the template, and an image with a newer photographing date and time is laid out on the lower right of the template. The image 1005 has the newest photographing date and time and is for the main slot, the templates (4-1) to (4-4) are set as candidates. The image 1006 which is an older photographing date and time for a sub-slot, that is, an image which is to be arranged on the upper left, is a longitudinal image, and the image 1007 which is a newer photographing date and time is a lateral image. Therefore, the template (4-2) is determined to be the most suitable template for the selected images, and layout using the template (4-2) is determined. As described above, in step S18, a template to be used for layout and information which is able to identify an image to be laid out in each of the slots of the template are determined.

In step S19, the image correction unit 214 performs image correction. In the case where the image correction condition input unit 213 inputs ON, image correction is performed. In the first embodiment, dodging processing, red-eye correction, and contrast correction are automatically performed as image correction. In the case where the image correction condition input unit 213 inputs OFF, image correction is not performed. An image to be corrected has 1,200 pixels in a short side, and ON/OFF of image correction is performed for an image which is converted into a color space of sRGB.

In step S20, the layout information output unit 215 creates layout information. Each image is laid out in accordance with the determination made in step S18. At this time, an image to be laid out is magnified and laid out in accordance with size information of each slot included in the template. An image used in this processing is an analysis image which is generated in step S01, and is different from an image which is used in the processing of steps S02 to S18. Then, bitmap data in which images are laid out in the template is generated.

In step S21, the processing of steps S17 to S20 has been completed for all the double-page spreads. In the case where the processing has not been completed for all the double-page spreads (No in step S21), the process returns to step S17. In the case where the processing has been completed for all the double-page spreads (Yes in step S21), the automatic layout process ends.

In the first embodiment, processing for dividing a photographing period into sections and selecting an image is performed for a sub-image group which is allocated to each double-page spread, for the number of images that is necessary for layout. Accordingly, images may be selected from individual periods of a sub-image group in a uniform manner. Therefore, an image (photograph) may be selected from a photographing period which includes a small number of images. Accordingly, for creation of an album, not only a photograph which is taken in a special event such as travel or a wedding ceremony, but also an image of a scene with a small number of photographs taken (for example, a casual daily scene) may be laid out. That is, in the first embodiment, for creation of an album, images of individual photographing times may be selected in a uniform manner, irrespective of the number of photographs taken, a layout image may be automatically generated.

Second Embodiment

In a second embodiment, for selection of an image, an image selection method is changed according to the type of image. The same explanation as the first embodiment will be omitted. Furthermore, the same parts as those in the first embodiment will be referred to with the same reference signs. Types of image include a still image, a cut-out image from a moving image, an SNS image, and the like.

Figure 13:
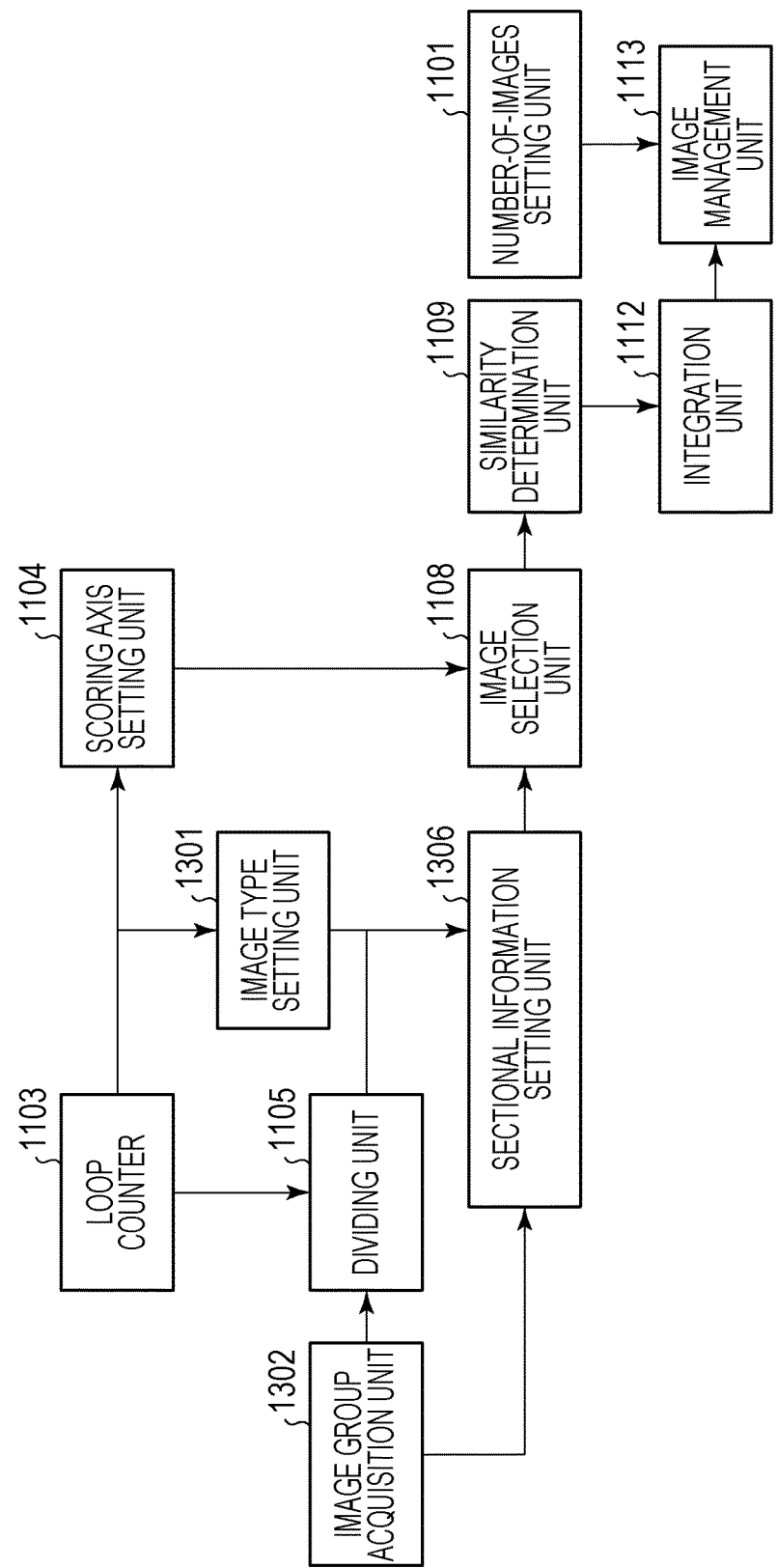
FIG. 13 is a diagram for explaining detailed image selection according to an embodiment.

FIG. 13 is a detailed explanatory diagram of the image selection unit 210 according to the second embodiment. Parts which are referred to with the same signs as those in FIG. 11 are similar to those in the first embodiment. Therefore, explanation for those similar parts will be omitted.

An image type setting unit 1301 sets the type of an image to be selected by the image selection unit 1108, in accordance with the number of processing times which is set by the loop counter 1103. In the second embodiment, in the case where loop count is 1, that is, in the first processing time, an SNS image is selected. In the case where loop count is 2, that is, in the second processing time, a cut-out image from a moving image is selected. In the case where loop count is 3 or more, that is, in the third or later processing time, a still image is selected. In the case where loop count is 1 and no SNS image exists in a sub-image group which is acquired by an image group acquisition unit 1302, a different type of image is selected. In a similar manner, in the case where loop count is 2 and no cut-out image from a moving image exists in a sub-image group which is acquired by the image group acquisition unit 1302, a different type of image is selected. In the second embodiment, either in the case where loop count is 1 and no SNS image exists or in the case where loop count is 2 and no cut-out image from a moving image exists, a still image is selected. The image group acquisition unit 1302 acquires a sub-image group which is allocated to a double-page spread as a processing target. For acquisition of a sub-image group, photographing date and time information of each image, the type of the image, a score for a main slot, and a score for a sub-slot are acquired. In the second embodiment, types of images are categorized into three: a still image, a cut-out image from a moving image, and an SNS image. However, the present invention is not limited to this. Other types of image may be used or still images may be further divided into a still image which is captured with a digital camera and a still image which is captured with a smart device.

A sectional information setting unit 1306 divides an image included in the sub-image group which is acquired by the image group acquisition unit 1302 into groups for individual sections obtained by the dividing unit 1105. An image of the image type which is set by the image type setting unit 1301 is selected, and photographing information of an image regarding the target image type and a score of each image are stored for each section.

Figure 14:
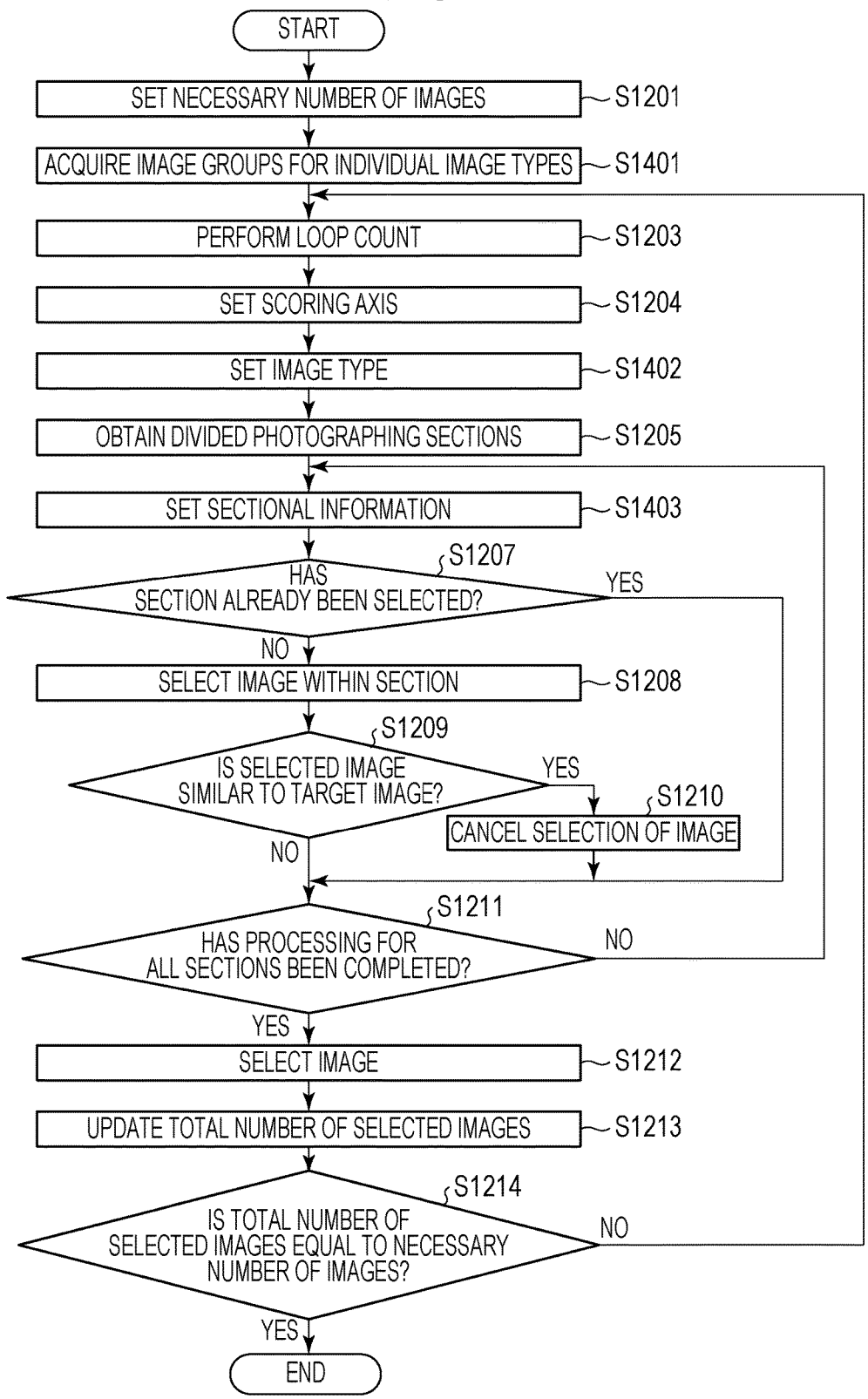
FIG. 14 is a detailed flowchart of image selection according to an embodiment.

FIG. 14 is a detailed flowchart of an image selection process according to the type of an image.

In step S1201, the number-of-images setting unit 1101 sets the total number of images to be selected from a sub-image group which is allocated to a double-page spread as a processing target.

In step S1401, the image group acquisition unit 1302 acquires photographing date and time information, an image type, and an image score of each image included in the sub-image group which is allocated to the double-page spread as a processing target.

In step S1203, the loop counter 1103 counts the number of times processing for image selection has been performed. The loop counter 1103 counts the number of times of image selection, irrespective of the type of image selected.

In step S1204, the scoring axis setting unit 1104 sets a scoring axis to be used. In the second embodiment, a scoring axis to be used is set in accordance with the number of times of image selection processing which is managed by the loop counter.

In step S1402, the image type setting unit 1301 sets the type of an image to be selected from the sub-image group by the image selection unit 1108. In the case where loop count is 1, that is, in the first processing time, in the second embodiment, setting is performed such that an SNS image is selected. In the case where loop count is 2, that is, in the second processing time, setting is performed such that a cut-out image from a moving image is selected. In the case where loop count is 3 or more, that is, in the third or later processing time, setting is performed such that a still image is selected.

In step S1205, the dividing unit 1105 calculates the photographing period from the photographing start time and the photographing end time of the sub-image group which is allocated to the double-page spread as a processing target, and equally divides the photographing period into sections, based on the number of processing times which is counted by the loop counter 1103.

In step S1403, the sectional information setting unit 1306 selects an image which matches the type of image which is set for each section, and stores photographing information of each image and a score of each image. That is, in the case where an SNS image is set as an image type for a certain section (first section), photographing information of an SNS image and a score of the SNS image (individual images in the case where two or more SNS images exist) from the first section are stored. In the case where a cut-out image from a moving image is set as an image type for a certain section (second section), photographing information of a cut-out image from a moving image and a score of the cut-out image from the moving image (individual images in the case where two or more cut-out images from moving images exist) from the second section are stored. In the case where a still image is set as an image type for a certain section (third section), photographing information of a still image and a score of the still image (individual images in the case where two or more still images exist) from the third section are stored. The processing of steps S1207 to S1214 is similar to that in the first embodiment. Therefore, explanation for the processing of steps S1207 to S1214 will be omitted.

In the second embodiment, the type of an image is set in step S1402. Therefore, in step S1403, the sectional information setting unit 1306 selects an image of the type which is specified in advance. Accordingly, an image which is selected in step S1408 is the same type as the specified image type. Specifically, in the second embodiment, by executing the process of the flowchart illustrated in FIG. 14, image selection is performed in the order of an SNS image, a cut-out image from a moving image, and a still image. As described above, in the second embodiment, selection of an image is not performed from a section from which an image has already been selected. Therefore, a still image is selected from a section from which an SNS image or a cut-out image from a moving image has not been selected, and a cut-out image from a moving image is selected from a section from which an SNS image has not been selected.

In the case where neither an SNS image nor a cut-image from a moving image exists in a sub-image group which is allocated to a double-page spread as a processing target, a still image is selected. Specifically, the processing of steps S1203 to S1212 is performed, and the total number of selected images is not incremented in step S1213. Then, since the total number of selected images is not equal to the necessary number of images in step S1214, the process returns to step S1203, and count up of the loop counter 1103 is performed. Accordingly, a still image is selected from the sub-image group. In the second embodiment, as in the first embodiment, processing for dividing a photographing period into sections and selecting an image is performed for a sub-image group which is allocated to each double-page spread, for the number of images necessary for layout. Accordingly, images may be selected from individual periods of the sub-image group in a uniform manner. Therefore, images (photographs) may be selected from a photographing period including a small number of images. Thus, for creation of an album, not only a photograph taken at a special event such as travel or a wedding ceremony, but also an image of a scene including a small number of photographs taken (for example, a casual daily scene) may be laid out. That is, in the second embodiment, for creation of an album, images of individual photographing times are selected in a uniform manner, irrespective of the number of photographs taken, and a layout image may be automatically generated.

Furthermore, according to the second embodiment, by setting the type of an image to be selected, an album may be automatically generated. Specifically, in the case where loop count is 1, an SNS image is set as the type of an image, and in the case where loop count is 2, a cut-out image from a moving image is set as the type of an image. That is, priority for image selection is given to an SNS image, a cut-out image from a moving image, and a still image in that order. Accordingly, in the case where an SNS image exists in a sub-image group, the SNS image is selected with a priority higher than the other types of image, and a cut-out image from a moving image is selected with a priority higher than a still image. Therefore, by layout of images in accordance with the image layout determined in step S18, a double-page spread including an SNS image, a cut-out image from a moving image, and a still image may be generated in step S20. An SNS image is highly likely to be a user's favorite image. Therefore, by providing a high priority to an SNS image, a double-page spread including the SNS image may be created in step S20, and it is highly likely to be able to create an album in which a user's favorite image is arranged. Furthermore, in the case where a moving image which is captured by a user exists, it is highly likely that a scene in which the user is highly interested is photographed. Therefore, by providing a high priority to a cut-out image from a moving image, a double-page spread including the cut-out image from a moving image may be created, and it is highly likely to be able to create an album in which an image of a scene in which the user is highly interested is arranged. That is, in the second embodiment, it is highly like to be able to create an album in which an image which is desired by the user is arranged.

According to the second embodiment, an image on a photographing date and time at which the number of photographs taken is small may also be selected.

Other Embodiments

The present invention is not intended to be limited to the foregoing embodiments. For example, in the foregoing embodiments, the album creation application has been explained by way of example. However, an application or an image processing apparatus which includes an image selection process which automatically selects a recommended image may be provided.

Furthermore, although the image processing apparatus which is assumed to be used under a local environment has been explained by way of example, the image processing apparatus is not limited to this. For example, an image processing apparatus on a server may be used. In this case, an image which is stored in the server may be used or uploaded.

In the foregoing embodiments, as illustrated in FIGS. 9A to 9I, an image is selected and is then divided into sections. However, the present invention is not limited to this. For example, in accordance with the number of images to be selected, a number of sections which corresponds to the number of images selected may be set in advance. A selection method in this case will be explained below with reference to FIGS. 9A to 9I. A case where a user desires to select four images will be explained. First, as illustrated in FIG. 9E, a photographing period is equally divided into four sections. Then, the first image is selected from any section. Next, the second image is selected from one of three sections from which the first image has not been selected. Next, the third image is selected from one of two sections from which neither the first image nor the second image has been selected. The fourth image is selected from a section from which none of the first image, the second image, and the third image have been selected. In the case where no image exists in a section, as in FIG. 9H, the section from which the first image is acquired, the section from which the second image is acquired, and the section from which the third image is acquired are divided into sections, and an image may be selected from one of the obtained sections.

In the foregoing embodiments, an image represents a photograph, and images are divided into groups according to the photographing date and time. However, images may be divided into groups according to the date and time at which an image was created.

In the foregoing embodiments, a method for selecting one image from one photographing section obtained by division has been explained. However, a plurality of images may be selected from one photographing section obtained by division. At this time, generation of a photographing section from which no image has been selected is avoided as much as possible. Furthermore, for example, only in the case where types of images are different, a plurality of images may be selected from the same photographing section. That is, for example, although only one still image is selected from one photographing section, an SNS image and a still image or a cut-out image from a moving image and a still image may be selected from one photographing section.

In the second embodiment, in the case where loop count is 3 or more, setting is performed such that a still image is selected. However, the present invention is not limited to this. In the case where loop count is 3 or more, setting may be performed such that any type of image is selected. Accordingly, for the third or later image, an image with a high score from among all the image types (an SNS image, a cut-out image from a moving image, and a still image) may be selected.

Furthermore, in the second embodiment, one SNS image and one cut-out image from a moving image are selected. However, the present invention is not limited to this. A plurality of SNS images may be selected or a plurality of cut-out images from moving images may be selected. At this time, the number of SNS images selected may be different from the number of cut-out images from moving images selected. In this case, in the case where a user desires to preferentially select SNS images or cut-out images from moving images, one type of image may be set as a type to be selected for each loop count in the case where loop count is 3 or more.

In the second embodiment, images are selected from a sub-image group in the order of an SNS image, a cut-out image from a moving image, and a still image. However, the present invention is not limited to this. Images may be selected in a different order.

Furthermore, in the second embodiment, both of an SNS image and a cut-out image from a moving image are selected. However, the present invention is not limited this. At least one of an SNS image and a cut-out image from a moving image may be selected. In this case, in the case where loop count is 1, an SNS image or a cut-out image from a moving image may be set as an image type in step S1402, and in the case where loop count is 2 or more, a still image may be set as an image type in step S1402.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157651 filed Aug. 7, 2015, and Japanese Patent Application No. 2015-254946 filed Dec. 25, 2015, which are hereby incorporated by reference herein in their entirety.

What is claimed is:

1. An image processing apparatus comprising:
at least one processor causing the image processing apparatus to act as:
an acquisition unit configured to acquire a plurality of images;
a deciding unit configured to decide the number of groups;
a separating unit configured to separate the plurality of images into the decided number of groups;
a setting unit configured to set the number of images to be selected from images included in one group among the separated groups;
an identifying unit configured to identify, based on a photographing date and time of each image included in the one group, a photographing period of the one group;
a dividing unit configured to divide the identified photographing period into a plurality of sections;
a selection unit configured to select, based on predetermined criteria, an image from images included in a target section which is one of the divided sections; and
a generation unit configured to generate a layout image by arranging the selected image,
wherein section division, in which the dividing unit further divides the section including the selected image, and image selection, in which the selection unit selects an image from an image-unselected section as a next target section, are repeated until the number of images selected from the one group reaches the set number of images.

2. The image processing apparatus according to claim 1, wherein the number of divided sections is different between a case where the set number is a first selection number and a case where the set number is a second selection number.

3. The image processing apparatus according to claim 1, wherein the number of divided sections is varied according to the set number of images and according to whether or not an image in each of the sections exists.

4. The image processing apparatus according to claim 1, wherein the dividing unit equally divides the photographing period.

5. The image processing apparatus according to claim 1, wherein the selection unit selects at least one image from an images included in one section.

6. The image processing apparatus according to claim 1,
wherein the selection unit selects, from the group, at least one of a cut-out image from a moving image and an image acquired from a social networking service, and a still image, and
wherein the generation unit generates a layout image including at least one of the cut-out image from the moving image and the image acquired from the social networking service, and the still image.

7. The image processing apparatus according to claim 1, wherein the setting unit sets the number of images to be selected from images included in the one group, based on the number of slots in a template used for generating the layout image, and wherein the layout image for the one group corresponds to a layout image for a double-page spread.

8. The image processing apparatus according to claim 1, wherein every time before one layout image is generated by the generation unit, setting for the number of images to be selected from images included in one group among the separated groups by the setting unit is performed.

9. The image processing apparatus according to claim 1, wherein an album is created by generating one or more layout images by the generation unit.

10. The image processing apparatus according to claim 1, further comprising:

a second setting unit configured to set a type of an image to be selected for each of the sections, wherein the selection unit selects, based on the type of image set by the second setting unit, an image from images included in each of the sections.

11. The image processing apparatus according to claim 10, wherein the second setting unit sets, for each of the sections, one of a cut-out image from a moving image, an image acquired from a social networking service, and a still image.

12. The image processing apparatus according to claim 1, wherein the dividing unit divides the photographing period after the selection unit selects one or more images from images included in the one group.

13. The image processing apparatus according to claim 1, wherein in a case where no section which has not been set as a target section exists and the number of selected images is smaller than the set number of images, the dividing unit further divides a section.

14. The image processing apparatus according to claim 1, wherein in a case where no section which has not been set as a target section exists and the number of selected images is smaller than the set number of images, the dividing unit divides one section into two photographing sections.

15. The image processing apparatus according to claim 1, further comprising:

a third setting unit configured to set the predetermined criteria, wherein the third setting unit sets evaluation criteria for each of the sections.

16. The image processing apparatus according to claim 15, wherein the third setting unit changes the evaluation criteria for each of the sections in accordance with an image selecting order.

17. The image processing apparatus according to claim 1, further comprising:

a determination unit configured to determine similarity between a selected first image and a selected second image which is selected prior to the first image data, wherein in a case where the determination unit determines that the first image and the second image are similar to each other, the selection unit cancels the selection of the first image.

18. The image processing apparatus according to claim 17, wherein the determination unit changes determination criteria in accordance with a photographing time difference between the first image and the second image.

19. An image processing method comprising:

acquiring a plurality of images; deciding the number of groups;

separating the plurality of images into the decided number of groups;

setting the number of images to be selected from images included in one group among the separated groups;

identifying, based on a photographing date and time of each image included in the one group, a photographing period of the one group;

dividing the identified photographing period into a plurality of sections;

selecting, based on predetermined criteria, and image from images included in a target section which is one of the divided sections; and generating a layout image by arranging the selected image, wherein section division, in which the dividing unit further divides the section including the selected image, and image selection, in which the selecting, selection of an image from image unselected section as a next target section to select, are repeated until the number of images selected from the one group reaches the set number of images.

* * * * *